US010386188B2

(12) United States Patent
Tian et al.

(10) Patent No.: US 10,386,188 B2
(45) Date of Patent: Aug. 20, 2019

(54) GEO-LOCATION OR NAVIGATION CAMERA, AND AIRCRAFT AND NAVIGATION METHOD THEREFOR

(71) Applicant: Yuneec Technology Co., Limited, Kowloon, Hong Kong (CN)

(72) Inventors: Yu Tian, Jiangsu (CN); Wenyan Jiang, Jiangsu (CN)

(73) Assignee: Yuneec Technology Co., Limited, Hong Kong (CN)

( * ) Notice: Subject to any disclaimer, the term of this patent is extended or adjusted under 35 U.S.C. 154(b) by 59 days.

(21) Appl. No.: 15/577,303

(22) PCT Filed: Jun. 29, 2016

(86) PCT No.: PCT/CN2016/087571
§ 371 (c)(1),
(2) Date: Nov. 27, 2017

(87) PCT Pub. No.: WO2017/000876
PCT Pub. Date: Jan. 5, 2017

(65) Prior Publication Data
US 2018/0149479 A1  May 31, 2018

(30) Foreign Application Priority Data

Jun. 29, 2015 (CN) .......................... 2015 1 0369254
Jun. 29, 2015 (CN) .......................... 2015 1 0369281
(Continued)

(51) Int. Cl.
*G01C 21/00* (2006.01)
*G05D 1/00* (2006.01)
(Continued)

(52) U.S. Cl.
CPC .......... *G01C 21/005* (2013.01); *B64C 39/024* (2013.01); *B64D 47/08* (2013.01);
(Continued)

(58) Field of Classification Search
None
See application file for complete search history.

(56) References Cited

U.S. PATENT DOCUMENTS 7,541,565 B2  6/2009  Ariyur et al.
7,865,277 B1  1/2011  Larson et al.
(Continued)

FOREIGN PATENT DOCUMENTS

CA       2830955 A1   4/2014
CN    101554925 A    10/2009
(Continued)

OTHER PUBLICATIONS

Teliere et al., "Chasing a moving target from a flying UAV", 2011 IEEE/RSJ International Conference on Intelligent Robots and Systems, Sep. 25-30, 2011, San Francisco, CA, USA.*
(Continued)

*Primary Examiner* — Edemio Navas, Jr.
(74) *Attorney, Agent, or Firm* — Law Offices of Liaoteng Wang

(57) ABSTRACT

Provided are a geo-location or navigation camera, and an aircraft and a navigation method therefor. The geo-location or navigation camera comprises an image capturing apparatus (15), an image capturing direction of the image capturing apparatus (15) being vertically downward. The camera further comprises a gimbal stability-enhancement system comprising a gimbal body and a gimbal control system connected to the gimbal body. The image capturing apparatus (15) is arranged on the gimbal body. By means of the balance control and shock absorption effects of the
(Continued)

gimbal stability-enhancement system, the stability of the image capturing apparatus (15) is better, and the image capturing direction of the image capturing apparatus (15) is maintained to be always vertically downward. The aircraft can still be navigated without a GPS. The method has advantages of being highly accurate and widely applicable.

22 Claims, 20 Drawing Sheets

(30) Foreign Application Priority Data

| | | | |
|---|---|---|---|
| Jun. 29, 2015 | (CN) | ..................... | 2015 2 0456110 U |
| Jun. 29, 2015 | (CN) | ..................... | 2015 2 0459593 U |
| Apr. 29, 2016 | (CN) | .......................... | 2016 1 0282288 |

(51) Int. Cl.

| | |
|---|---|
| *G05D 1/10* | (2006.01) |
| *G06K 9/00* | (2006.01) |
| *G06K 9/46* | (2006.01) |
| *G06K 9/62* | (2006.01) |
| *G08G 5/04* | (2006.01) |
| *H04N 5/232* | (2006.01) |
| *B64C 39/02* | (2006.01) |
| *B64D 47/08* | (2006.01) |
| *G03B 15/00* | (2006.01) |
| *G03B 17/12* | (2006.01) |
| *G05D 1/02* | (2006.01) |
| *G06K 9/20* | (2006.01) |
| *G06T 7/60* | (2017.01) |
| *G01S 17/02* | (2006.01) |
| *G01S 17/93* | (2006.01) |
| *G01S 7/481* | (2006.01) |
| *H04N 5/247* | (2006.01) |

(52) U.S. Cl.
CPC ............ *G01S 7/481* (2013.01); *G01S 17/023* (2013.01); *G01S 17/933* (2013.01); *G03B 15/006* (2013.01); *G03B 17/12* (2013.01); *G05D 1/0038* (2013.01); *G05D 1/0094* (2013.01); *G05D 1/0202* (2013.01); *G05D 1/101* (2013.01); *G06K 9/0063* (2013.01); *G06K 9/209* (2013.01); *G06K 9/46* (2013.01); *G06K 9/4604* (2013.01); *G06K 9/6202* (2013.01); *G06T 7/60* (2013.01); *G08G 5/045* (2013.01); *H04N 5/2328* (2013.01); *H04N 5/23296* (2013.01); *B64C 2201/027* (2013.01); *B64C 2201/108* (2013.01); *B64C 2201/141* (2013.01); *B64C 2201/146* (2013.01); *G06K 2209/21* (2013.01); *G06T 2207/10032* (2013.01); *H04N 5/23238* (2013.01); *H04N 5/247* (2013.01)

(56) References Cited

U.S. PATENT DOCUMENTS

| | | | |
|---|---|---|---|
| 9,710,709 B1* | 7/2017 | Beard | ..................... G06F 16/51 |
| 2007/0058885 A1 | 3/2007 | Leib et al. | |
| 2008/0187173 A1* | 8/2008 | Kim | .................. G06K 9/00234 |
| | | | 382/103 |
| 2010/0103036 A1* | 4/2010 | Malone | .................. B60R 25/24 |
| | | | 342/357.34 |
| 2011/0282580 A1 | 11/2011 | Mohan | |
| 2014/0037278 A1 | 2/2014 | Wang | |
| 2014/0119716 A1* | 5/2014 | Ohtomo | .................. G01C 11/00 |
| | | | 396/8 |
| 2014/0180914 A1 | 6/2014 | Abhyanker | |
| 2014/0240498 A1 | 8/2014 | Ohtomo et al. | |
| 2014/0336848 A1 | 11/2014 | Saund et al. | |
| 2015/0176752 A1 | 6/2015 | Lewis | |
| 2016/0063987 A1* | 3/2016 | Xu | ........................ B64C 39/024 |
| | | | 381/71.12 |
| 2016/0371985 A1* | 12/2016 | Kotecha | ............... G08G 5/0034 |

FOREIGN PATENT DOCUMENTS

| | | | |
|---|---|---|---|
| CN | 101860562 | A | 10/2010 |
| CN | 102012612 | A | 4/2011 |
| CN | 102426019 | * | 8/2011 |
| CN | 102183955 | A | 9/2011 |
| CN | 102426019 | A | 4/2012 |
| CN | 102506875 | A | 6/2012 |
| CN | 102602543 | A | 7/2012 |
| CN | 102707724 | A | 10/2012 |
| CN | 102779347 | A | 11/2012 |
| CN | 102999049 | A | 3/2013 |
| CN | 103029834 | A | 4/2013 |
| CN | 103144770 | A | 6/2013 |
| CN | 203219298 | U | 9/2013 |
| CN | 103411609 | A | 11/2013 |
| CN | 103984357 | A | 8/2014 |
| CN | 204013920 | U | 12/2014 |
| CN | 204056311 | U | 12/2014 |
| CN | 104317288 | A | 1/2015 |
| CN | 104354859 | A | 2/2015 |
| CN | 204297112 | U | 4/2015 |
| CN | 105182326 | A | 12/2015 |
| CN | 204925807 | U | 12/2015 |
| JP | 2006238325 | A | 9/2006 |
| KR | 20110023472 | A | 3/2011 |

OTHER PUBLICATIONS

Oh et al., "Coordinated Standoff Tracking of Groups of Moving Targets Using Multiple UAVs", 2013 21st Mediterranean Conference on Control & Automation (MED) Platanias-Chania, Crete, Greece, Jun. 25-28, 2013.*
The First Official Action and search report dated Sep. 6, 2018 for Chinese application No. 201510369254.5, 13 pages.
The Official Action dated Feb. 23, 2018 for Chinese application No. 201510369281.2, 6 pages.
The Official Action and first search report dated Jun. 19, 2018 for Chinese application No. 201610282288.5, 13 pages.
Wei Zhu, "Vision-Based Quad-Rotor Aircraft Target Recognition and Tracking", WANFANG Academic Papers, dated Mar. 1, 2016, pp. 11-15 and 57.
PCT International Search Report for PCT/CN2016/087571, dated Oct. 12, 2016.
The Extended European Search Report for European Application No. 16817240.1, dated Jan. 25, 2019, 7 pages.

* cited by examiner

GEO-LOCATION OR NAVIGATION CAMERA, AND AIRCRAFT AND NAVIGATION METHOD THEREFOR

CROSS-REFERENCE TO RELATED APPLICATION

This application claims priority to Chinese Patent Application CN201510369281.2 filed on Jun. 29, 2015, Chinese Patent Application CN201520456110.9 filed on Jun. 29, 2015, Chinese Patent Application CN201510369254.5 filed on Jun. 29, 2015, Chinese Patent Application CN201520459593.8 filed on Jun. 29, 2015, and Chinese Patent Application CN201610282288.5 filed on Apr. 29, 2016. This application refers to all the disclosure of the above Chinese Patent Applications.

TECHNICAL FIELD

The present invention relates to the field of aircraft navigation, and particularly to a geo-location or navigation camera, and an aircraft and a navigation method therefor.

BACKGROUND

In the prior art, a camera for capturing a ground image is arranged on some aircrafts, however, it is generally arranged on an airplane. In this case, as an aircraft may tilt and shake during the flight, such changes in flight attitude are likely to cause camera lens unable to face the ground all the time, thus imaging compensation is needed. In order to achieve better imaging results, the combined effect of computer calculation compensation and sensor angle compensation are generally used in the prior art to compensate for imaging problems. However, using such multiple compensation methods will result in a significant increase in imaging error, and is also not conducive for the subsequent application and calculation of the resulting ground image.

In addition, the existing aircraft widely uses Global Positioning System (GPS) for navigation, but this navigation method always has some drawbacks, such as: 1. the GPS signal strength is insufficient to position. GPS mainly depends on satellites to achieve the positioning. The more the number of satellites is, the more accurate the positioning is. However, some areas are difficult to be covered by a satellite due to being sheltered by tall buildings or high mountains, which makes the GPS signal strength in these areas is insufficient and thus it is difficult to position; 2. map data need to be updated constantly, otherwise the accuracy of navigation will be affected. In addition to the precise positioning of GPS, the existing navigation system also rely on accurate map data to navigate. In order to obtain the latest map data, a user often needs to update a software, otherwise a navigation route error and other issues are likely to appear.

In addition, a difficult problem in flying control is how to avoid an obstacle during the process of flying for an aircraft. In related arts, it's usually dependent on an operator's remote control level, that is, the operator first use the naked eye to determine whether an obstacle exists around the aircraft, and then control the aircraft through the remote control to change the flying direction so as to avoid an obstacle. However, in practice, the following situations often occur in case of using the above approach: 1. the operator can't determine whether an obstacle exists around the aircraft if the aircraft has been flying outside the operator's field of view; 2. the operator may also perform an improper operation even if the operator see an obstacle, causing the aircraft to collide with the obstacle.

As can been seen, no matter which situation occurs, the aircraft will inevitably collide with an obstacle, causing the aircraft to be damaged or destroyed.

SUMMARY

The technical problem to be solved by the present invention is to overcome the shortcomings that a ground image captured by an aircraft has a large imaging error due to multiple imaging compensation and is not conducive for the calculation and application involved in the ground image, and there are provided a geo-location or navigation camera, and an aircraft and a navigation method therefor.

The present invention solves the above technical problem by the following technical solutions.

The present invention provides a geo-location or navigation camera comprising an image capturing apparatus, wherein an image capturing direction of the image capturing apparatus is vertically downward; wherein the camera further comprises a gimbal stability-enhancement system comprising a gimbal body and a gimbal control system connected to the gimbal body; the image capturing apparatus is arranged on the gimbal body.

The present invention further provides an aircraft comprising a navigation system, the navigation system comprises a camera according to any combination of preferred conditions described above and a second controller; wherein the image capturing apparatus of the camera is configured for capturing an image when the aircraft is flying; the second controller comprises an acquisition module and a correction module; the acquisition module is configured for acquiring a set of reference images for displaying a designated flying route; the correction module is configured for comparing an image newly captured by the image capturing apparatus with the set of reference images when the aircraft is flying, and correcting the current flying route of the aircraft.

The present invention further provides a navigation method for an aircraft comprising a camera according to any combination of preferred conditions described above, the image capturing apparatus of the camera is configured for capturing an image when the aircraft is flying; wherein the navigation method comprises: a step $S_1$ of acquiring a set of reference images for displaying a designated flying route; a step $S_2$ of comparing an image newly captured by the image capturing apparatus with the set of reference images when the aircraft is flying, and correcting the current flying route of the aircraft.

DETAILED DESCRIPTION

A First Embodiment

Figure 1:
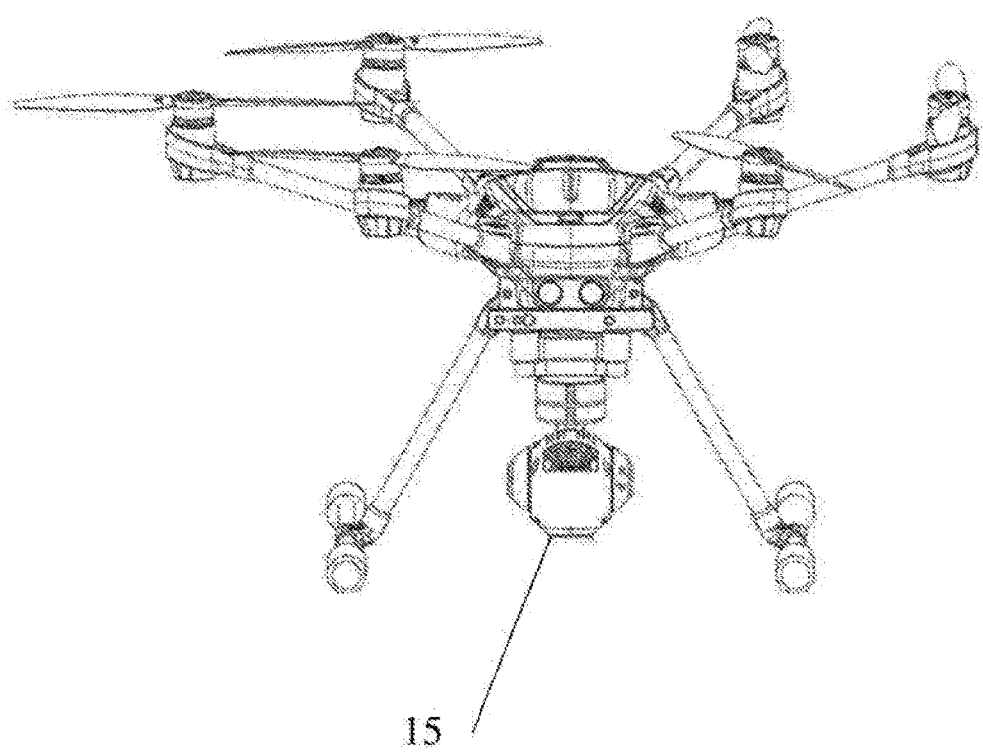
FIG. 1 is a front view of an aircraft when it is flying vertically forward according to a first embodiment of the present invention.
Figure 2:
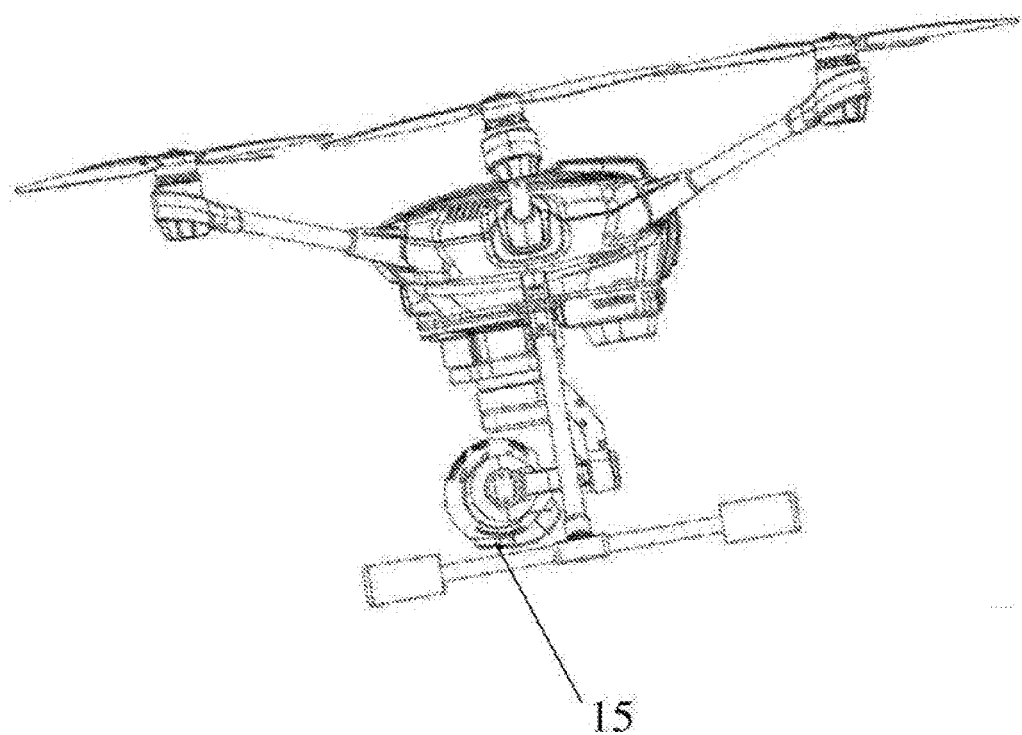
FIG. 2 is a side view of an aircraft when it is flying vertically forward according to the first embodiment of the present invention.
Figure 3:
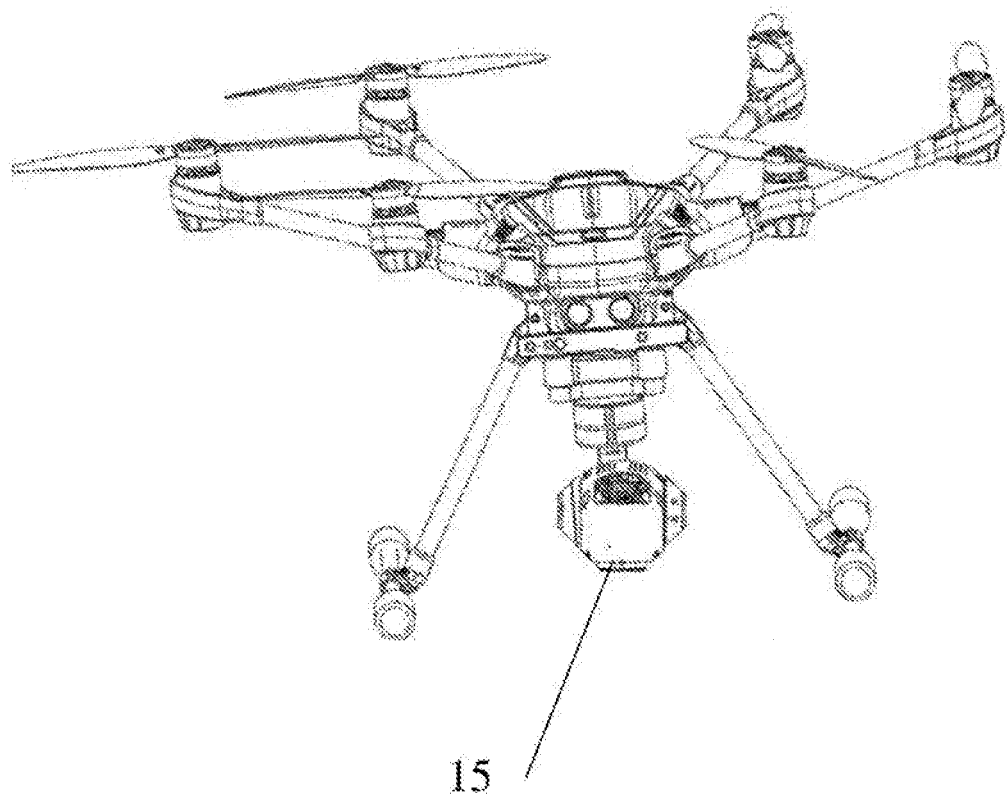
FIG. 3 is a front view of an aircraft when it is flying to the right vertically according to the first embodiment of the present invention.
Figure 4:
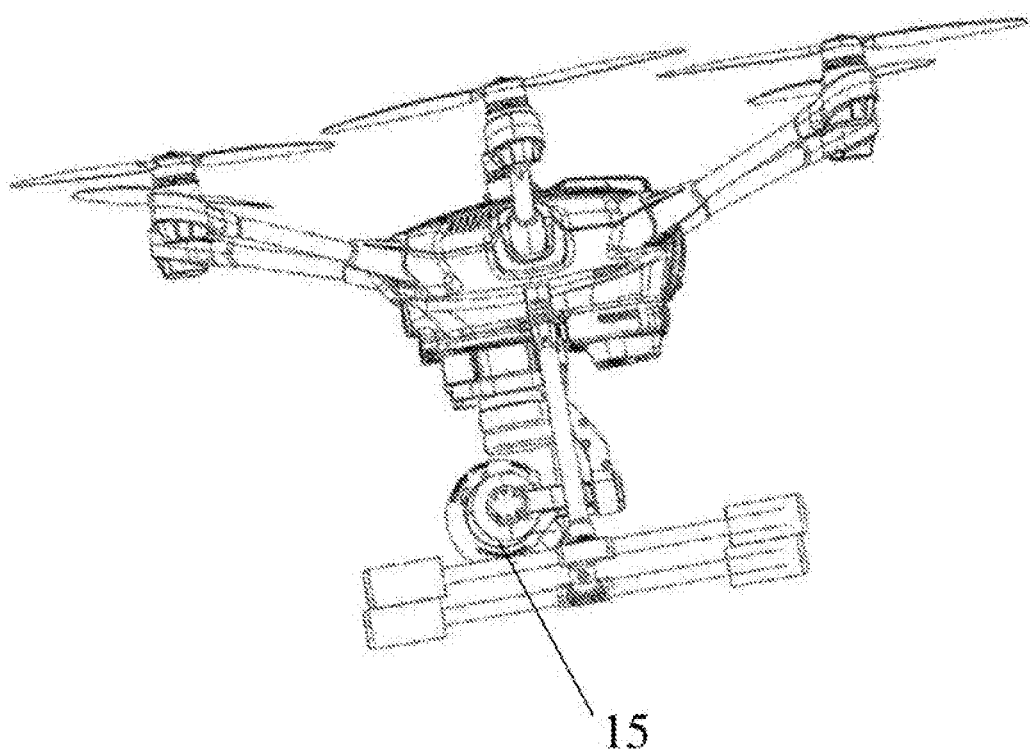
FIG. 4 is a side view of an aircraft when it is flying to the right vertically according to the first embodiment of the present invention.
Figure 5:
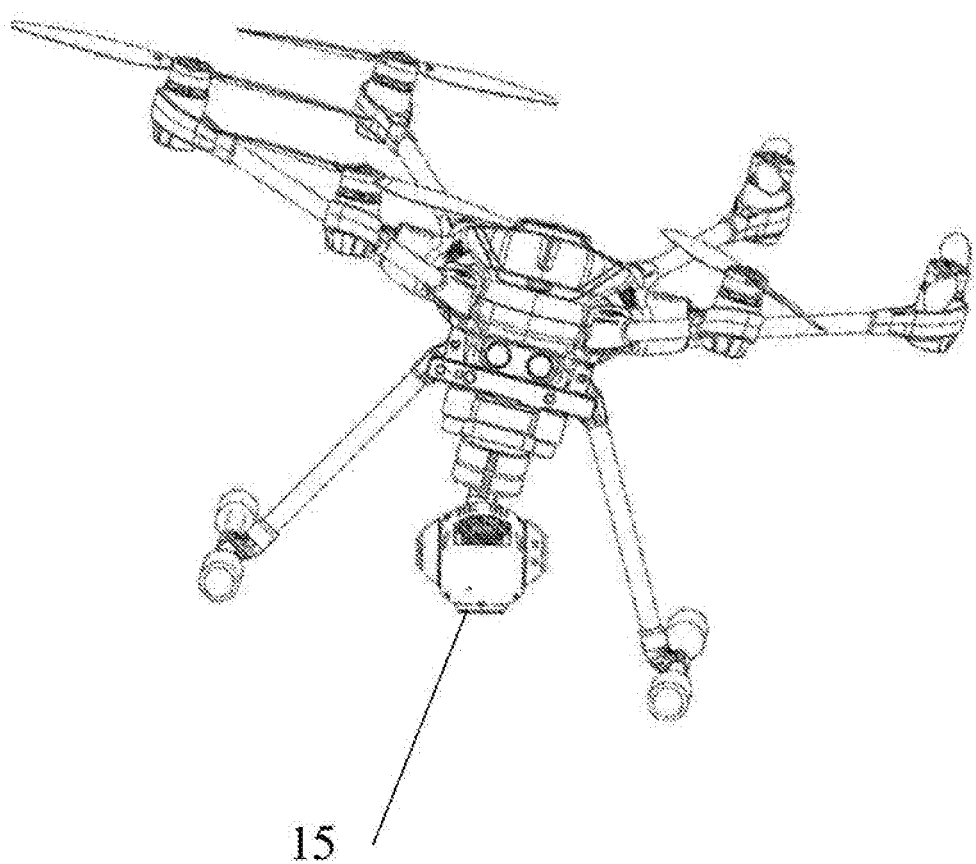
FIG. 5 is a front view of an aircraft when it is flying to the left vertically according to the first embodiment of the present invention.
Figure 6:
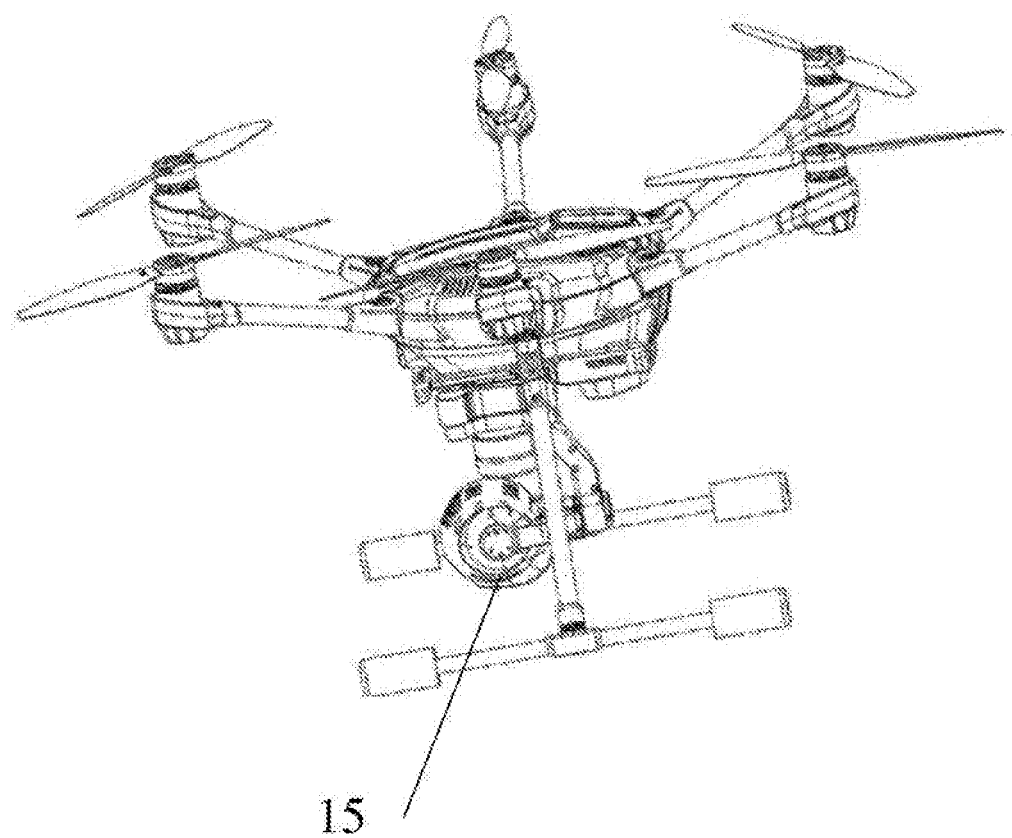
FIG. 6 is a side view of an aircraft when it is flying to the left vertically according to the first embodiment of the present invention.

A geo-location or navigation camera according to the present embodiment may include an image capturing apparatus and a gimbal stability-enhancement system. An image capturing direction of the image capturing apparatus is vertically downward. FIG. 1 shows a front view of an aircraft when it is flying vertically forward, FIG. 2 shows a side view of an aircraft when it is flying vertically forward, FIG. 3 shows a front view of an aircraft when it is flying to the right vertically, FIG. 4 shows a side view of an aircraft when it is flying to the right vertically, FIG. 5 shows a front view of an aircraft when it is flying to the left vertically, and FIG. 6 shows a side view of an aircraft when it is flying to the left vertically. Image capturing directions of an image capturing apparatus 15 in FIGS. 1-6 are all vertically downward.

The gimbal stability-enhancement system may include a gimbal body and a gimbal control system connected to the gimbal body. The image capturing apparatus is arranged on the gimbal body.

Figure 7:
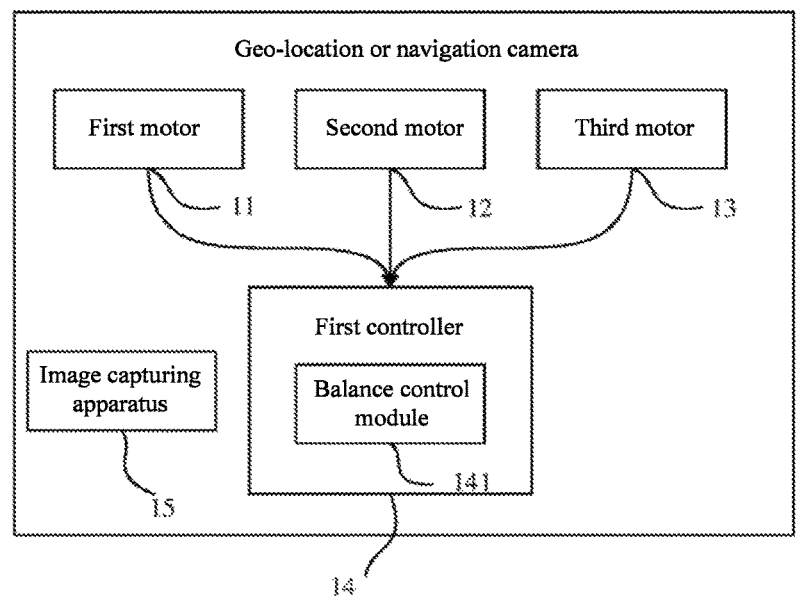
FIG. 7 is a schematic diagram of a camera according to one implementation of the first embodiment of the present invention.

As shown in FIG. 7, the gimbal control system may include a first controller 14, a first motor 11, a second motor 12 and a third motor 13. The first motor 11, the second motor 12, and the third motor 13 may be configured for controlling the rotation of the gimbal body in three axial directions of a three-dimensional coordinate system respectively. The first controller 14 may include a balance control module 141. The balance control module 141 may be electrically connected to the first motor 11, the second motor 12, and the third motor 13 respectively, and may be configured for controlling operation of the first motor 11, the second motor 12 and the third motor 13 to cause the image capturing direction of the image capturing apparatus to be vertically downward.

The first motor 11, the second motor 12, and the third motor 13 may be configured for controlling the rotation of the gimbal body on the Yaw axis, the Pitch axis and the Roll axis, respectively.

Figure 8:
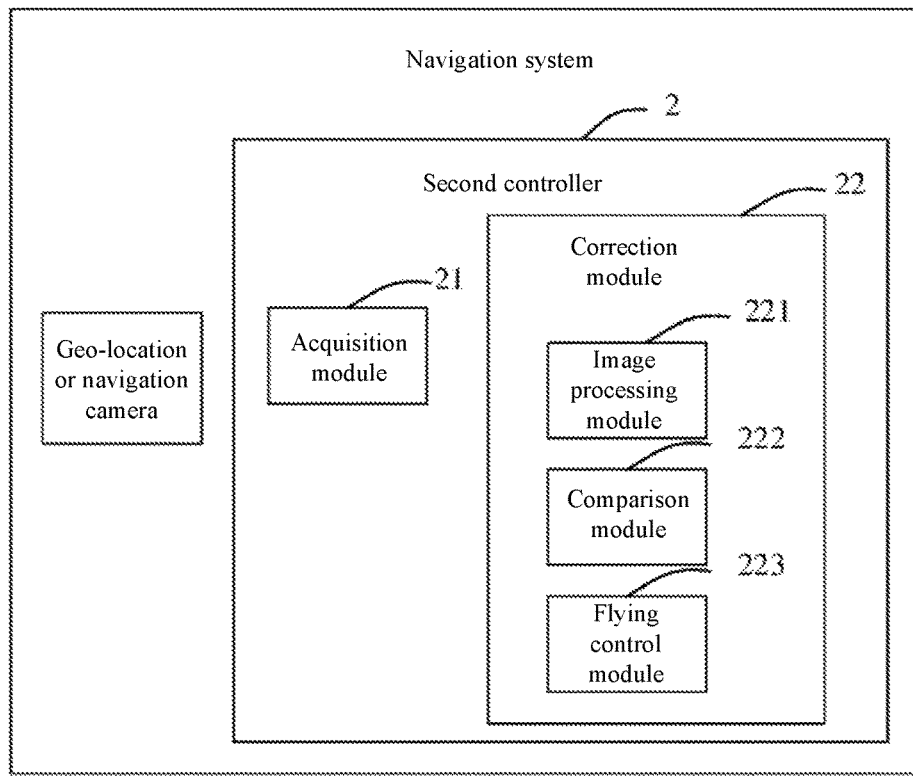
FIG. 8 is a schematic diagram of a navigation system of an aircraft according to one implementation of the first embodiment of the present invention.

As shown in FIG. 8, a navigation system of an aircraft of the present embodiment may include the camera and a second controller 2.

The image capturing apparatus 15 of the camera is configured for capturing an image when the aircraft is flying. In capturing by the image capturing apparatus 15 of the camera, a time interval for capturing an image may be preset. For example, the time interval may be set as 1 minute, that is, the image capturing apparatus 15 may capture an image once every 1 minute while the aircraft is flying. The captured images may directly show the terrain, buildings or the like under the aircraft.

The second controller 2 may include an acquisition module 21 and a correction module 22.

Figure 9:
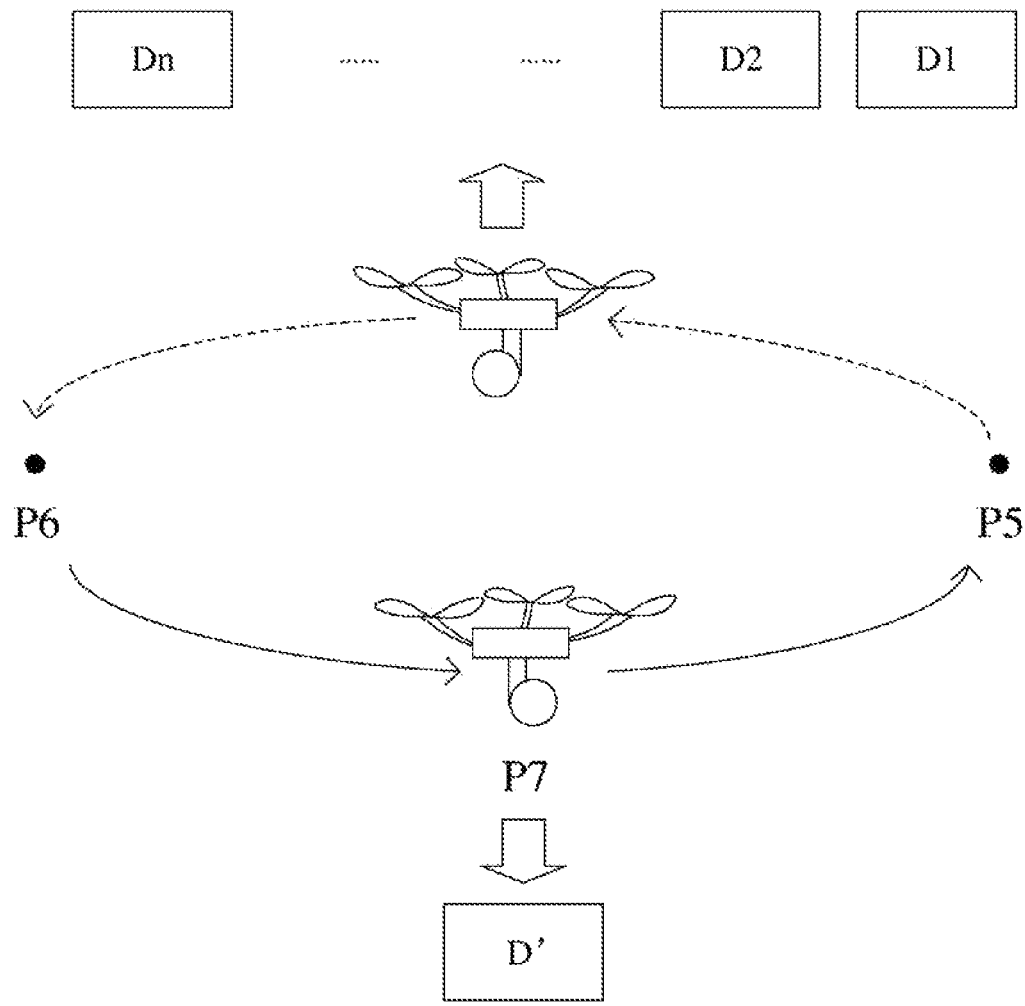
FIG. 9 is a schematic diagram of a flying route of an aircraft according to the first embodiment of the present invention.

The acquisition module 21 may be configured for acquiring a set of reference images for displaying a designated flying route. The reference images may be topographic maps of the designated flying route. The designated flying route may include a return route for the aircraft, and a topographic map of the return route may be captured by the image capturing apparatus 15 when the aircraft is on the outward voyage. Taking FIG. 9 as an example, a route for the aircraft on the outward voyage may be from a position P5 to a position P6, and a set of topographic maps D1, D2, . . . , Dn may be captured by the ground-based image capturing apparatus on the outward voyage (may be captured once every the time interval, and n is a positive integer, the specific contents of the topographic maps are not shown), the topographic maps D1, D2, . . . , Dn may be used as reference images during the return voyage of the aircraft flying from the position P6 back to the position P5. The designated flying route may further include any route that specifies a starting point and an ending point, and for such designated flying route, the navigation system may obtain a corresponding reference image by pre-storing or downloading via the network.

The correction module 22 may be configured for comparing a newly captured image with the set of reference images when the aircraft is flying, and correcting the current flying route of the aircraft.

In particular, the correction module 22 may include an image processing module 221, a comparison module 222, and a flying control module 223.

The image processing module 221 may be configured for selecting a reference image from the set of reference images as a comparing image, and extracting the feature information from a newly captured image and the comparing image respectively. More specifically, the image processing module 221 may extract the feature information of each of the set of reference images and select a reference image having the largest amount of same feature information as the newly captured image as the comparing image. Also taking FIG. 9 as an example, during the return voyage of the aircraft flying from the position P6 back to the position P5, the image D' may be captured at a position P7 (P7 is between P6 and P5), and an image having the largest amount of same feature information as the image D' (i.e., an image closest to the image D') may be selected from the topographic maps D1-Dn as a comparing image.

The comparison module 222 may be configured for comparing the offset of the same feature information in the newly captured image and the comparing image.

The flying control module 223 may be configured for changing the current flying direction and flying altitude of the aircraft according to the offset.

Figure 10:
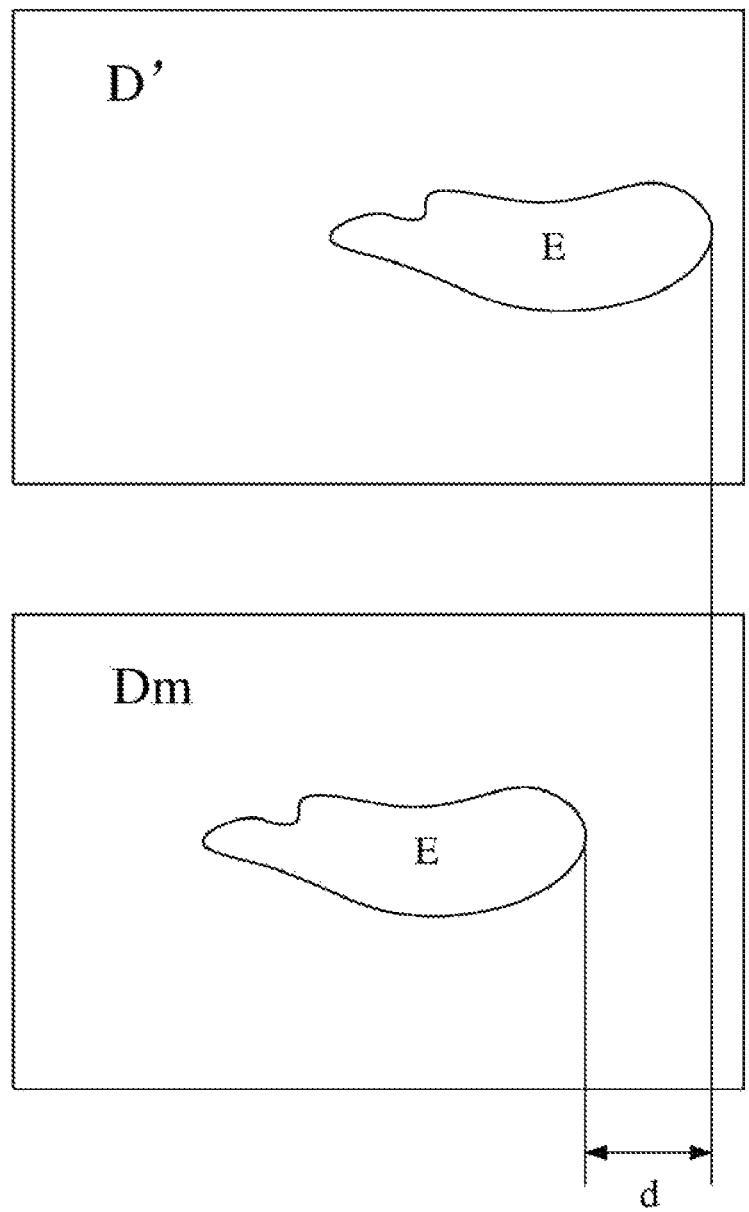
FIG. 10 is a schematic diagram of an image captured by an image capturing apparatus at a position P7 in FIG. 9 and a comparing image according to the first embodiment of the present invention.

For example, if the position of the same feature information in the newly captured image is shifted to the right relative to its position in the comparing image, the flying direction of the aircraft should be moved to the left. The calculation of the offset may also be appropriately combined with the current flying altitude and/or flying speed of the aircraft, and the like. Further explanation will be made below in connection with FIG. 10, an image D' may be captured by the ground-based image capturing apparatus when the aircraft arrives at the position P7 in FIG. 18, wherein there is a lake E in the image D'. The topographic map Dm (1≤M≤N) may be one of the reference images and have the largest amount of same feature information (including the lake E) as the image D', and thus the topographic map Dm may be used as the comparing image, wherein the lake E is the same feature information. By comparing the image D' and the topographic map Dm, it can be known that the position of the lake E in the image D' is shifted to the right relative to the position of the lake E in the topographic map Dm, then the flying direction of the aircraft should be moved to the left on the basis of the original flying direction to reduce the offset d of the lake E in the image D' and the topographic map Dm. The navigation system of the present embodiment may correct the flying route continuously by repeatedly capturing images below the aircraft and comparing the images with the reference images, so as to realize the addressing and return of the aircraft quickly and accurately.

In another implementation of the navigation system of the first embodiment, the navigation system may also be suitable for target tracking of the aircraft, and a target tracking method suitable for the aircraft may be applied to the tracking aircraft. The navigation system may further include a GPS positioning unit configured for receiving a GPS positioning signal at a location; wherein the aircraft body may fly toward a location corresponding to a GPS positioning signal. The following aircraft body may be part of the aircraft.

Since a GPS signal receiver may be arranged on a target to be tracked, the GPS signal receiver may acquire the latitude and longitude coordinates returned from a GPS system and may forward them. If the aircraft body is initiated, it may acquire the latitude and longitude coordinates forwarded by the GPS signal receiver. The aircraft body may fly toward a location corresponding to the GPS positioning signal according to the latitude and longitude coordinates, and during the flight, the image capturing apparatus may take pictures of an area where a reference target is located to obtain a reference image.

The image capturing apparatus may extract from a reference image a reference image feature of a reference target and the initial position information of the reference target in the reference image, and the reference target may be at a position of a certain point of the reference image. In practice, the coordinate values of the point in the coordinate system established based on the reference image may be denoted as the initial position information. Similarly, the temporary position information described hereinafter may be a certain point of a temporary target in a temporary image, and in practice, the coordinate values of the point in the coordinate system established based on the temporary image may be denoted as the temporary position information. In addition, the reference image feature and the initial position information may be initialized in the aircraft body. The reference image feature may be used as a reference feature for subsequent selection of a target to be tracked, and a target consistent with the reference feature may be recorded as a target to be tracked. The initial position information may be used as a reference point of a target to be tracked in an image captured by the image capturing apparatus. The coordinate system of the reference image is the same as that of the temporary image, and in the present invention, the vertex at the upper left corner of the reference image is the coordinate origin. The part on the right of the coordinate origin is the positive axis of the x-axis, and the part below the coordinate origin is the positive axis of the y-axis, and the size of the coordinates may be calculated in a pixel as the smallest unit. When a target to be tracked deviates from the reference point, the aircraft body may be controlled to rotate to achieve the transformation of the image capturing angle of the image capturing apparatus and to cause the target to be tracked to return to the position of the reference point again. In practice, the background subtraction technology and the like may be used to extract the gray, color and other information of the reference target, the interference caused by the noise, pseudo-target and the like may be eliminated through the threshold processing, morphological operation and other techniques, and then the reference image feature and the initial position information of the reference target may be obtained through the contour extraction technology and the like.

Since the image capturing apparatus takes pictures in real time during the flight, a temporary image feature of a temporary target and the temporary position information of the temporary target in the temporary image may be extracted from the temporary image when the image capturing apparatus acquires the temporary image showing the temporary target. A temporary image feature may include, but not limited to, the gray, color, shape or the like of a temporary target. In practice, a temporary image feature of a temporary target may be extracted selectively according to the usage scenario.

If the reference image feature and the temporary image feature are consistent (for example, it is assumed that the first color and shape information of the reference target may be extracted in the reference image, and the color and shape information of the temporary target may be extracted in the temporary image, and only if the color of the temporary target is consistent with the color of the reference target, and the shape of the temporary target is consistent with the shape of the reference target), it is determined that the temporary target is the target to be tracked. The image capturing apparatus may calculate the deviation direction based on the difference between the initial position information and the temporary position information, that is, may calculate the difference between a horizontal coordinate of the initial position information (i.e., the abscissa of the initial position information) and a horizontal coordinate of the temporary position information (i.e., the abscissa of the temporary position information) and the difference between a vertical coordinate of the initial position information (i.e., the ordinate of the initial position information) and a vertical coordinate of the temporary position information (i.e., the ordinate of the temporary position information), and determine the deviation direction based on the two differences. The aircraft body may continue to track the temporary target based on the deviation direction so that the difference between the initial position information and the temporary position information may reduce gradually. For example, if the temporary position information deviates a certain distance to the right relative to the initial position information, the aircraft body may fly toward to the right side so that the temporary position information may gradually approach to the initial position information. The temporary image feature of an target may include but not limited to gradient direction histogram, local binary pattern histogram, scale invariant feature transformation and accelerated robust feature, that is, a template matching method, a histogram matching method or a FLANN-based matching method may be used to lock a temporary target to be the target to be tracked.

The aircraft body may track based on the deviation direction.

In addition, since targets to be tracked by the aircraft body may include static targets and dynamic targets, it is necessary for the aircraft body to keep a reasonable distance from a target in order to avoid collision of the aircraft body with the target while avoiding losing track of the target. When the aircraft body is too close to a temporary target, the scale of the target in an image captured by the image capturing apparatus may become larger, and when the aircraft body is too far from a temporary target, the scale of the target in an image captured by the image capturing apparatus may become smaller. By controlling the aircraft body to increase or reduce its flying speed, the distance between the aircraft body and a temporary target may conform to the following constraint: $0.9*Z<X<1.1*Z$, where Z may be a preset threshold, and X may be the distance between the aircraft body and a temporary target. For example, a vehicle is moving forward at a constant speed, and an aircraft may be responsible for tracking the vehicle and may keep a distance of 500 meters from the vehicle, wherein 500 meters is a preset threshold.

The aircraft body may determine the distance from the vehicle according to a change in a width value and a height value of a temporary target in a temporary image, wherein the width value may refer to a horizontal length value of the temporary target in the temporary image, and the height value may refer to a longitudinal length value of the temporary target in the temporary image. In the present embodiment, the image capturing apparatus may extract the first reference scale information and the second reference scale information of the reference target from the reference image, wherein the first reference scale information may be a width value of the reference target in the reference image, and the second reference scale information may be a height value of the reference target in the reference image.

When the image capturing apparatus determines that the reference image feature is consistent with the temporary image feature, the image capturing apparatus may extract the first temporary scale information and the second temporary scale information of the temporary target from the temporary image, wherein the first temporary scale information may be a width value of the temporary target in the temporary image, and the second temporary scale information may be a height value of the temporary target in the temporary image.

When the value of the first reference scale information is larger than the value of the first temporary scale information, the image capturing apparatus may calculate a difference between the first reference scale information and the first temporary scale information, and if the absolute value of the difference is larger than a preset threshold, the aircraft body may increase its flying speed.

When the value of the first reference scale information is smaller than the value of the first temporary scale information, the image capturing apparatus may calculate a difference between the first reference scale information and the first temporary scale information, and if the absolute value of the difference is larger than a preset threshold, the aircraft body may reduce its flying speed.

When the value of the second reference scale information is larger than the value of the second temporary scale information, the image capturing apparatus may calculate a difference between the second reference scale information and the second temporary scale information, and if the absolute value of the difference is larger than a preset threshold, the aircraft body may increase its flying speed.

When the value of the second reference scale information is smaller than the value of the second temporary scale information, the image capturing apparatus may calculate a difference between the second reference scale information and the second temporary scale information, and if the absolute value of the difference is larger than a preset threshold, the aircraft body may reduce its flying speed.

When a position of the temporary target captured by the image capturing apparatus in the temporary image is located away from the reference point, it is necessary to adjust the flying direction of the aircraft body in time. The position of the temporary target in the temporary image may always be kept at the reference point by the adjustment of the flying direction. Therefore the target tracking method suitable for the aircraft may also include the following steps.

When the image capturing apparatus determines that a temporary vertical coordinate of the temporary position information (i.e., the temporary ordinate of the temporary position information) is not consistent with an initial vertical coordinate of the initial position information (i.e., the initial ordinate of the initial position information), a difference between the temporary vertical coordinate and the initial vertical coordinate may be calculated to generate longitudinal displacement information, wherein the initial vertical coordinate may be a position coordinate acquired by the image capturing apparatus in the coordinate system established based on the reference image, and the temporary vertical coordinate may be a position coordinate acquired by the image capturing apparatus in the coordinate system established based on the temporary image.

The pitch axis of the gimbal may be rotated according to the longitudinal displacement information to adjust a vertical angle of the image capturing apparatus for capturing a temporary image.

When a temporary horizontal coordinate of the temporary position information is not consistent with an initial horizontal coordinate of the initial position information, a difference between the temporary horizontal coordinate and the initial horizontal coordinate may be calculated to generate lateral displacement information, wherein the initial horizontal coordinate may be a position coordinate acquired by the image capturing apparatus in the coordinate system established based on the reference image, the temporary horizontal coordinate may be a position coordinate acquired by the image capturing apparatus in the coordinate system established based on the temporary image.

The yaw axis of the gimbal may be rotated according to the lateral displacement information to adjust a horizontal angle of the image capturing apparatus for capturing a temporary image.

In another implementation, the pitch axis and yaw axis of the gimbal may be rotated simultaneously so that the temporary vertical coordinate and the temporary horizontal coordinate may change simultaneously.

Further, in the process of tracking a temporary target by the aircraft body, the temporary target may be subject to deformation, a color change or the like due to its own reasons or external reasons. The temporary image features of the target including but not limited to gradient direction histogram, local binary pattern histogram, scale invariant feature transformation, and accelerated robust feature may change. In this case, the present invention employs a method of establishing a target group and updating a temporary image feature, or the like.

The image capturing apparatus may search for a similar target in real time in a temporary image and extract a reference feature of a similar target. When the reference feature is consistent with one of the temporary image features, for example, the color of the similar target is the same as the color of the temporary target, or the color and shape of the similar target are the same as the color and shape of the temporary target respectively, the similar target then may be regarded as a candidate target in the target group.

When the aircraft body detects a change in any of the temporary image feature, the temporary position information, the first temporary scale information, and the second temporary scale information, the temporary image feature, the temporary position information, the first temporary scale information, and the second temporary scale information after the change may be used to update the temporary image feature, the temporary location information, the first temporary scale information, and the second temporary scale information before the change respectively, to eliminate or reduce the interference with the tracking system due to factors such as a target appearance change or occlusion and so on, and thus to improve the stability of the tracking system and the accuracy of the tracking results.

In order to facilitate an operator to view, in the present invention, the position information and the scale information of the candidate target or the temporary target tracked by the aircraft body may be selectively displayed on the image capturing apparatus (the image capturing apparatus may have a display function). In one embodiment, the image capturing apparatus may be connected to a display, and the display may be used to display the position information and the scale information of the candidate target or the temporary target.

The image capturing apparatus may acquire and calculate the provisional coordinate information, the first provisional scale information and the second provisional scale information of the similar target, wherein the first provisional scale information may be a width value of the similar target in the temporary image, and the second provisional scale information may be a height value of the similar target in the temporary image.

When the image capturing apparatus detects a target group and the image capturing apparatus tracks a temporary target, the provisional coordinate information, the first provisional scale information, and the second provisional scale information of the target group may be weighted with the temporary position information, the first temporary scale information and second temporary scale information of the temporary target respectively, and the result of the weighting calculation may be output to the image capturing apparatus to display the result of the weighting calculation.

Figure 11:
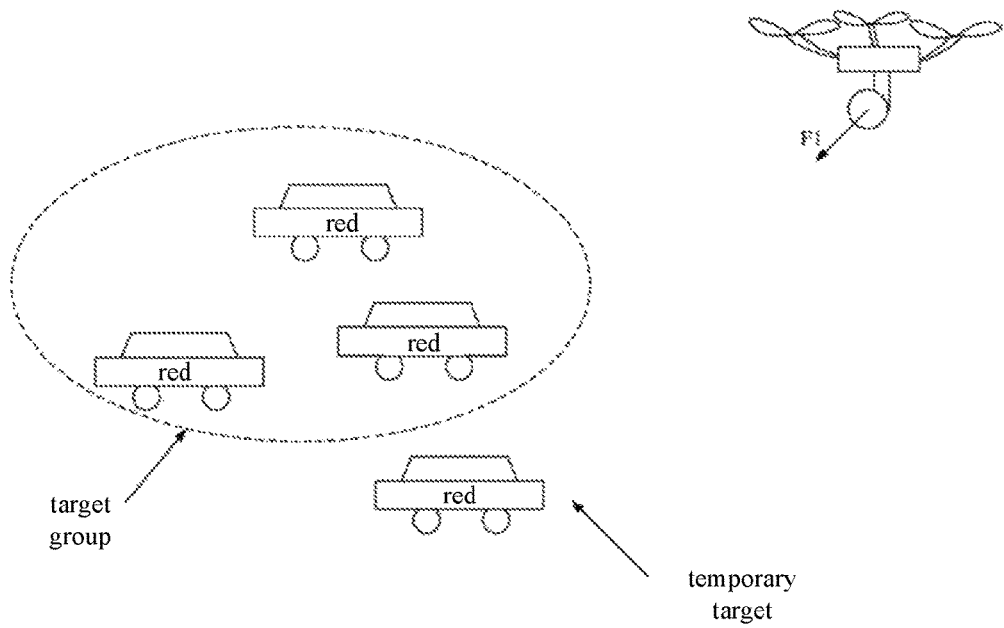
FIG. 11 is a schematic diagram of tracking a vehicle by an aircraft in another implementation of a navigation system according to the first embodiment of the present invention.

As an example of tracking a vehicle by the aircraft, as shown in FIG. 11, the image capturing direction of the image capturing apparatus of the aircraft may be the direction of the arrow F1, which is toward a vehicle to be tracked. When there is more than one vehicle in front of the aircraft and the colors of the vehicles are the same, the vehicles other than a temporary target may be classified into a target group. In this case, the provisional coordinate information, the first provisional scale information, and the second provisional scale information of each vehicle in the target group may be weighted with the temporary position information, the first temporary scale information and the second temporary scale information of the temporary target, namely the vehicle to be tracked, respectively, and the result of the weighting calculation may be output to the image capturing apparatus to display the result of the weighting calculation.

When the image capturing apparatus does not detect a target group and the image capturing apparatus tracks a temporary target, the temporary position information, the first temporary scale information, and the second temporary scale information of the temporary target may be output to the image capturing apparatus to display the temporary position information, the first temporary scale information and the second temporary scale information.

Figure 12:
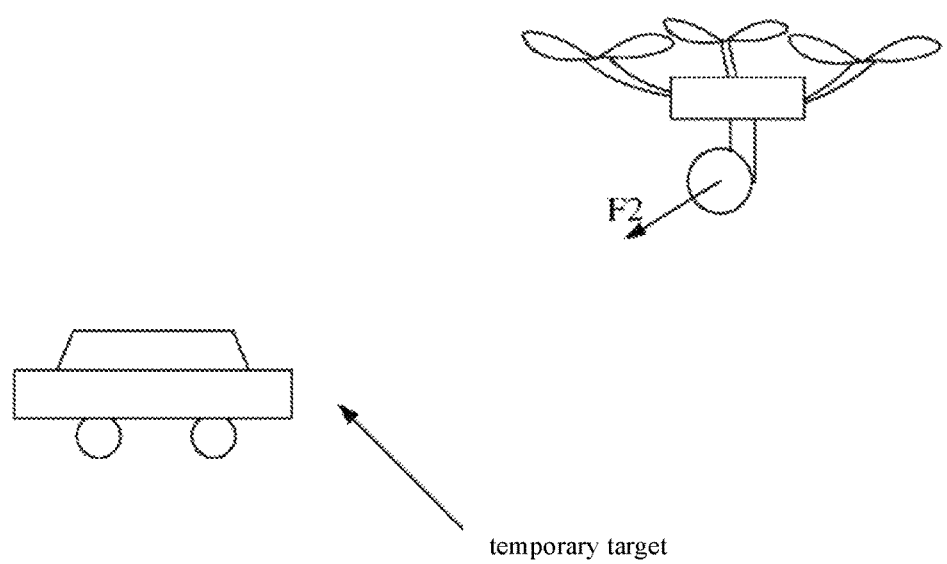
FIG. 12 is another schematic diagram of tracking a vehicle by an aircraft in another implementation of a navigation system according to the first embodiment of the present invention.

As an example of tracking a vehicle by the aircraft, as shown in FIG. 12, the image capturing direction of the image capturing apparatus of the aircraft may be the direction of the arrow F2, which is toward a vehicle to be tracked. When there is only one vehicle in front of the aircraft, the vehicle is a temporary target. The temporary position information, the first temporary scale information, and the second temporary scale information of the vehicle may be output to the image capturing apparatus to display the temporary position information, the first temporary scale information, and the second temporary scale information.

When the image capturing apparatus detects a target group and the image capturing apparatus does not track a temporary target, the provisional coordinate information, the first provisional scale information, and the second provisional scale information of the target group may be weighted respectively, and the result of the weighting calculation may be output to the image capturing apparatus to display the result of the weighting calculation.

Figure 13:
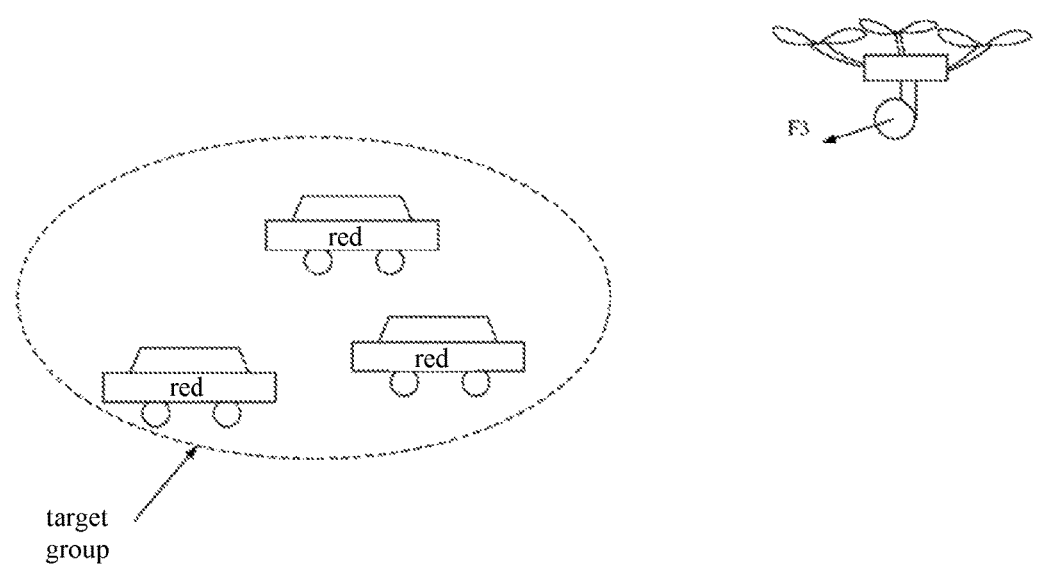
FIG. 13 is yet another schematic diagram of tracking a vehicle by an aircraft in another implementation of a navigation system according to the first embodiment of the present invention.

As an example of tracking a vehicle by the aircraft, as shown in FIG. 13, the image capturing direction of the image capturing apparatus of the aircraft may be the direction of the arrow F3, which is toward a vehicle to be tracked. When there are a plurality of vehicles in front of the aircraft but none of them is a temporary target, and one of the features of the vehicles is the same as that of the vehicle to be tracked, the plurality of vehicles may be classified into a target group. In this case, the provisional coordinate information, the first provisional scale information, and the second provisional scale information of each vehicle in the target group may be weighted respectively, and the result of the weighting calculation may be output to the image capturing apparatus to display the result of the weighting calculation. When the image capturing apparatus does not detect a target group and the image capturing apparatus does not track a temporary target, no information will be output to the image capturing apparatus.

The above results output to the image capturing apparatus may also be displayed on the display so that an operator can view the details of tracking a target by the aircraft in real time.

For example, the aircraft body may track a bird. The bird to be tracked may receive a GPS signal. If the aircraft body is initiated, the aircraft body may fly toward a location corresponding to the GPS positioning signal, and during the flight, the image capturing apparatus may take pictures of an area where the bird is located to obtain a reference image. The image capturing apparatus may extract a reference image feature of a reference target from the reference image, for example, the size and the color of the bird, and the like, and may extract the initial position information of the reference target in the reference image. It is assumed that the bird is located at the center point of the reference image. The aircraft body may take pictures during the flight. When the image capturing apparatus acquires a temporary image showing a temporary target, a temporary image feature of the temporary target and the temporary position information of the temporary target in the temporary image may be extracted from the temporary image. When the reference image feature and the temporary image feature are consistent, the image capturing apparatus may calculate the deviation direction based on the difference between the initial position information and the temporary position information. The aircraft body may track based on the deviation direction. In addition, the image capturing apparatus may extract a width value and a height value of the reference target from the reference image. When the image capturing apparatus determines that the reference image feature and the temporary image feature are consistent, that is, the temporary target is the bird to be tracked, the image capturing apparatus may extract a width value and a height value of the bird from the temporary image. When the width value and the height value of the reference target are inconsistent with the width value and the height value of the bird extracted in the temporary image, it may show that the distance between the aircraft body and the bird may deviate from a preset threshold. For example, if the width value of the reference target is greater than the width value of the bird extracted from the temporary image, it may show that the distance between the aircraft body and the bird may be larger than a threshold, therefore the aircraft body may increase its flying speed so that the distance between the aircraft body and the temporary target may be kept within a threshold range. The threshold range may be set between 0.9*threshold and 1.1*threshold in the present invention. When the temporary target deviates from the center point of the reference image, the image capturing apparatus may calculate a difference between a temporary vertical coordinate and an initial vertical coordinate and generate longitudinal displacement information, and the pitch axis of the aircraft body may be rotated according to the longitudinal displacement information to adjust a vertical angle of the image capturing apparatus for capturing a temporary image. Thereafter, the image capturing apparatus may calculate a difference between a temporary horizontal coordinate and an initial horizontal coordinate and generate lateral displacement information, and the yaw axis of the aircraft body may be rotated according to the lateral displacement information to adjust a horizontal angle of the image capturing apparatus for capturing a temporary image. In this way, by adjusting the aircraft body, the flying direction of the aircraft body may direct toward the bird to be tracked in real time, while in the temporary image acquired by the image capturing apparatus, the bird may be kept at the center point of the reference image, and thus it is convenient for viewing, while avoiding losing track of the target.

The technical effects of the navigation system provided by the present embodiment is that during the flight of the aircraft body toward a location corresponding to the GPS positioning signal, the image capturing apparatus may acquire a reference image and a temporary image, and obtain feature parameters from the reference image and the temporary image, so that the aircraft body may track a target by matching and calculating of the feature parameters without tracking by relying on the GPS positioning signal, thus improving the accuracy of the tracking.

Figure 14:
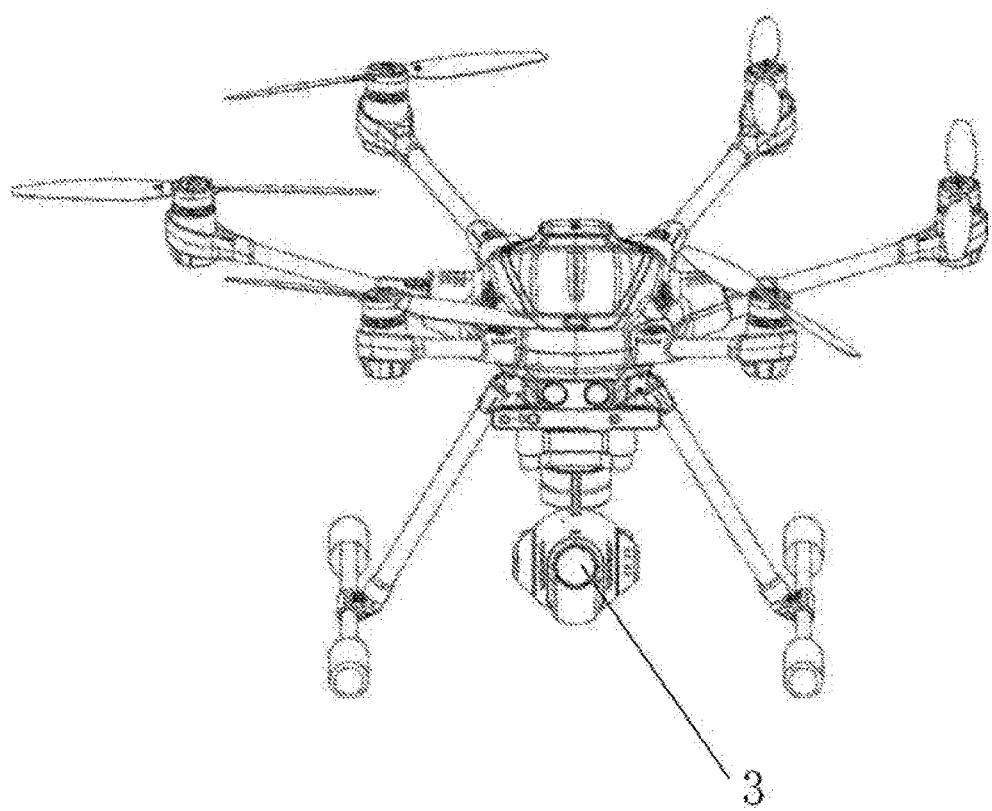
FIG. 14 is a front view of an aircraft when it is flying forward according to another implementation of the first embodiment of the present invention.
Figure 15:
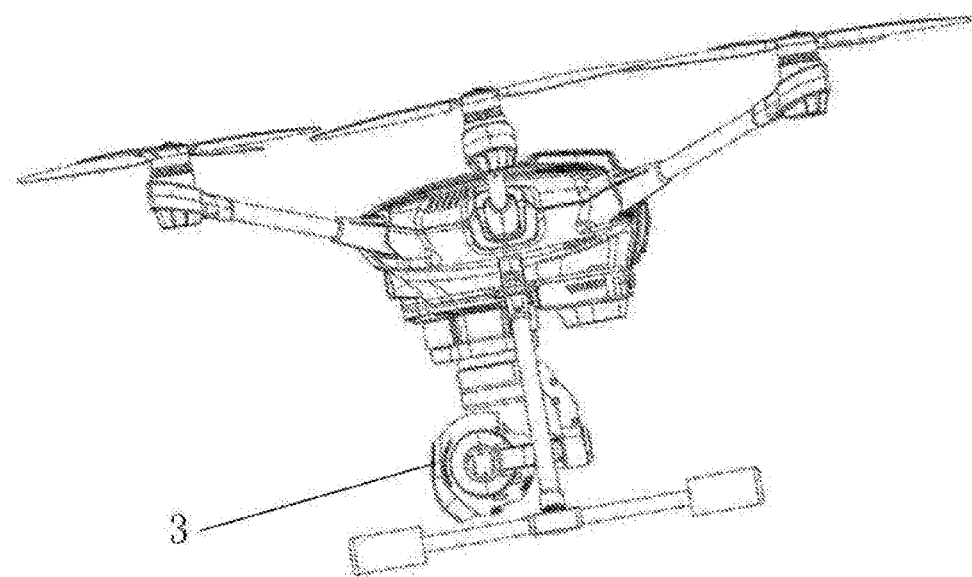
FIG. 15 is a side view of an aircraft when it is flying forward according to another implementation of the first embodiment of the present invention.
Figure 16:
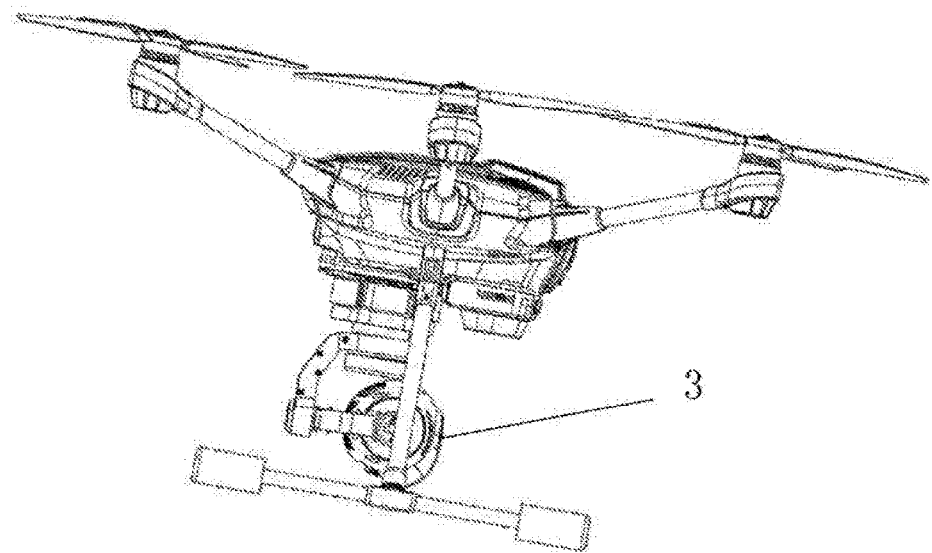
FIG. 16 is a front view of an aircraft when it is flying backward according to another implementation of the first embodiment of the present invention.
Figure 17:
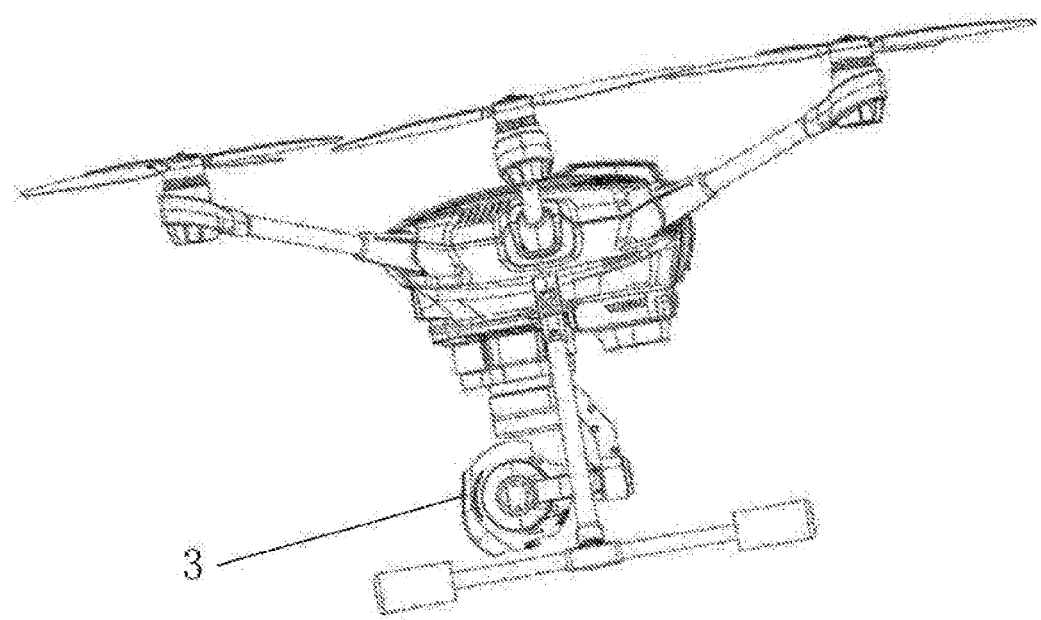
FIG. 17 is a side view of an aircraft when it is flying backward according to another implementation of the first embodiment of the present invention.

In another implementation of the navigation system of the first embodiment, as shown in FIGS. 14 to 17, the navigation system may further include an obstacle avoidance imaging capturing apparatus 3 and a third controller, wherein the obstacle avoidance image capturing apparatus may be arranged on the gimbal body; the obstacle avoidance image capturing apparatus may be configured for capturing an image in a flying direction when the aircraft is flying. FIG. 14 shows a front view of the aircraft when it is flying forward, FIG. 15 shows a side view of the aircraft when it is flying forward, FIG. 16 shows a front view of the aircraft when it is flying backward. FIG. 17 shows a side view of the aircraft when it is flying backward. The gimbal control system may further include a fourth controller, a fourth motor, a fifth motor and a sixth motor, the fourth motor, the fifth motor and the sixth motor are configured for controlling the rotation of the gimbal body in three axial directions of a three-dimensional coordinate system respectively. The fourth controller may include a first balance control module, the first balance control module may be electrically connected to the fourth motor, the fifth motor and the sixth motor respectively and configured for controlling operation of the fourth motor, the fifth motor and the sixth motor to ensure that the image capturing direction of the image capturing apparatus is forward.

The fourth motor, the fifth motor and the sixth motor may be configured for controlling the rotation of the gimbal body on the Yaw axis, the Pitch axis and the Roll axis, respectively. The fourth motor and the first motor may be the same motor or different motors, and the fifth motor and the second motor may be the same motor or different motors, and the sixth motor and the third motor may be the same motor or different motors.

Figure 18:
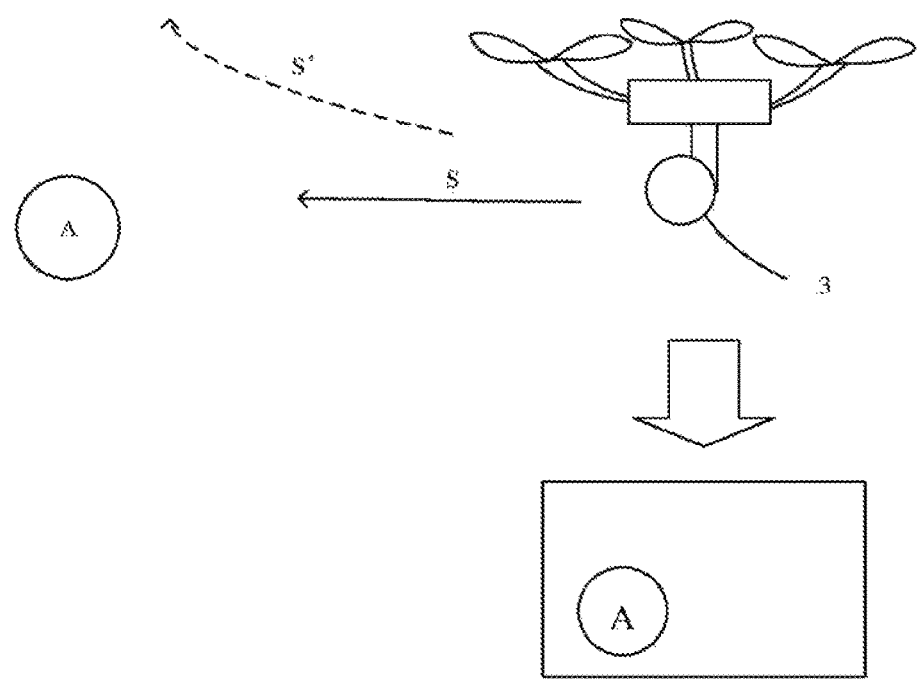
FIG. 18 is a schematic diagram of another flying route of an aircraft and an image captured by an image capturing apparatus according to the first embodiment of the present invention.

The third controller is configured for determining whether an obstacle exists in the image captured by the obstacle avoidance image capturing apparatus, and if yes, changing the flying direction of the aircraft according to a position of the obstacle, and if not, controlling the aircraft to fly in the current flying direction. For example, as shown in FIG. 18, the aircraft may originally fly in the direction indicated by the arrow S, and there is an obstacle A at the lower left in front of the aircraft. The circle 3 may represent the flying image capturing apparatus, and the box below the aircraft is an image captured by the image capturing apparatus. There is an obstacle A in the lower left corner of the image, so the flying direction of the aircraft may move up and to the right, changing to fly in the direction indicated by the arrow S'.

In order to enable the navigation system to determine a position of an obstacle more accurately, the navigation system may further includes a distance measurement module, which is a laser distance measurement module.

Figure 19:
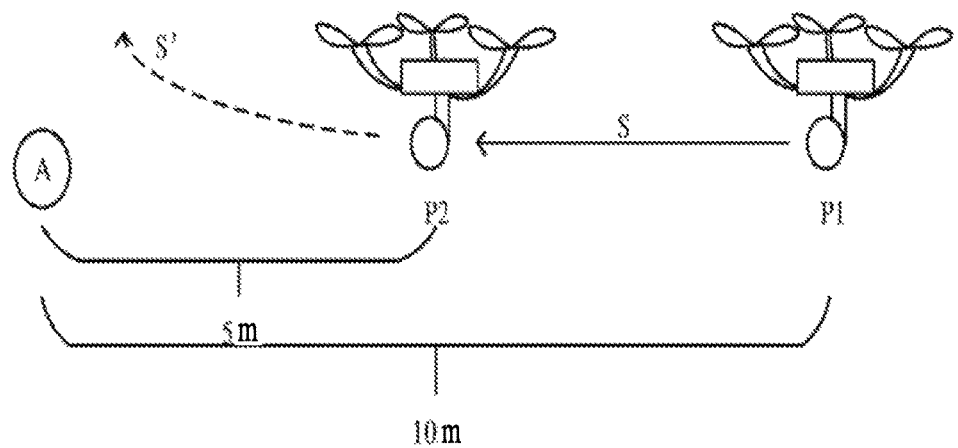
FIG. 19 is a schematic diagram of another flying route of an aircraft according to the first embodiment of the present invention.

The third controller may be further configured for invoking the distance measurement module to detect a distance between the aircraft and an obstacle when it is determined that the obstacle exists in an image captured by the obstacle avoidance image capturing apparatus, changing the flying direction of the aircraft according to a position of the obstacle if the distance is less than or equal to a distance threshold, and controlling the aircraft to fly in the current flying direction if the distance is greater than the distance threshold. Taking FIG. 19 as an example, when the aircraft is at the position P1, the distance between the obstacle A and the aircraft measured by the distance measurement module is 10 meters. If the preset distance threshold is 5 meters, then the aircraft may continue to fly along the current flying direction S until the aircraft reaches the position P2, where the distance between the obstacle A and the aircraft measured by the distance measurement module 13 is shortened to be 5 meters, and at this point the aircraft may change the flying direction to fly along the direction indicated by the arrow S'.

Figure 20:
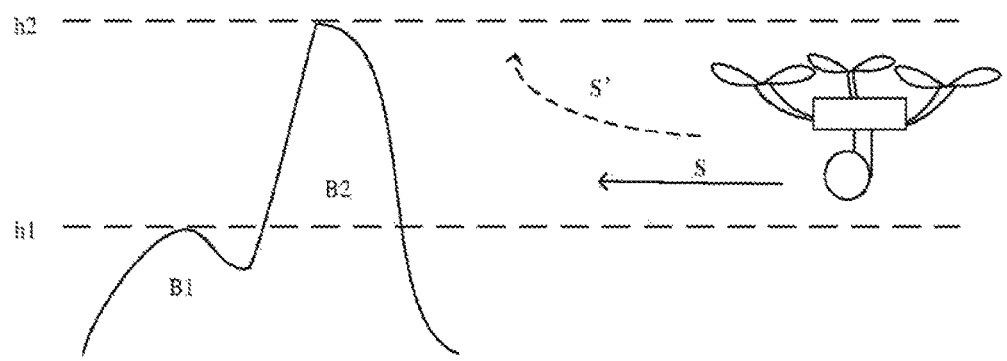
FIG. 20 is a schematic diagram of yet another flying route of an aircraft according to the first embodiment of the present invention.

In order to avoid frequent adjustments of the flying condition of the aircraft, the third controller may be further configured for determining whether the altitude of an obstacle is higher than the flying altitude of the aircraft when it is determined that the obstacle exists in an image captured by the obstacle avoidance image capturing apparatus 11, and if yes, increasing the flying altitude of the aircraft, and if not, controlling the aircraft to fly in the current flying direction. As will be explained with reference to FIG. 20, the aircraft may originally fly in the direction indicated by the arrow S, and there are two obstacles in front of the aircraft, namely a high mountain B1 and a high mountain B2 respectively. If the aircraft is flying towards the mountain B1, the high mountain B1 may exist in an image captured by the obstacle avoidance image capturing apparatus, and it is determined that the altitude h1 of the high mountain B1 is lower than the flying altitude of the aircraft, then the aircraft will continue to fly in the direction indicated by the arrow S. If the aircraft is flying towards the mountain B2, the high mountain B2 may exist in an image captured by the obstacle avoidance image capturing apparatus, and it is determined that the altitude h2 of the high mountain B2 is higher than the flying altitude of the aircraft, then the aircraft will increase the flying altitude, changing to fly in the direction indicated by the arrow S'.

In another implementation of the obstacle avoidance system of the first embodiment, the obstacle avoidance system may also adjust the flying speed of the aircraft in order to prevent the aircraft from colliding with an obstacle. Two specific ways to adjust the flying speed are provided below.

The first way is to adjust the flying speed by detecting a distance between the aircraft and the obstacle by means of a distance measurement module. The details are as follows.

The third controller may be further configured for invoking the distance measurement module to detect a distance between the aircraft and the obstacle when it is determined that the obstacle exists in an image captured by the obstacle avoidance image capturing apparatus, and adjusting the flying speed of the aircraft according to a relationship between the distance and a preset threshold. The adjusting the flying speed of the aircraft according to a relationship between the distance and a preset threshold may include reducing the flying speed of the aircraft when the distance is less than or equal to the preset threshold.

The preset threshold may be set freely, and its specific numerical size may be considered in conjunction with the distance threshold. The preset threshold may be smaller than the distance threshold, in which case when it is determined that an obstacle exists in an image captured by the obstacle avoidance image capturing apparatus, the navigation system may first determine whether the distance between the aircraft and the obstacle is less than or equal to the distance threshold so as to determine whether to change the flying direction, and then determine whether the distance between the aircraft and the obstacle is less than the preset threshold so as to determine whether to reduce the flying speed. The preset threshold may also be greater than the distance threshold, in which case when it is determined that an obstacle exists in an image captured by the obstacle avoidance image capturing apparatus, the navigation system may first determine whether the distance between the aircraft and the obstacle is less than the preset threshold so as to determine whether to reduce the flying speed, and then determine whether the distance between the aircraft and the obstacle is less than or equal to the distance threshold so as to determine whether to change the flying direction. The preset threshold may also be equal to the distance threshold, in which case when it is determined that an obstacle exists in an image captured by the obstacle avoidance image capturing apparatus, the navigation system may determine whether the distance between the aircraft and the obstacle is less than or equal to the distance threshold (which is equal to the preset threshold) so as to determine whether to change the flying direction and to reduce the flying speed at the same time.

The second way is to adjust the flying speed by means of an image captured by the obstacle avoidance image capturing apparatus. The details are as follows.

The third controller may be further configured for extracting a reference image feature of a reference target from a reference image and extracting a temporary image feature of a temporary target from a temporary image when it is determined that an obstacle exists in an image captured by the obstacle avoidance image capturing apparatus. The temporary image is an image, among images captured by the obstacle avoidance image capturing apparatus, where an obstacle exists and whose capture time is closest to the current time, that is, a newly captured image where an obstacle exists. The reference image is an image, among images captured by the obstacle avoidance image capturing apparatus, where an obstacle exists and whose capture time is prior to the capture time of the temporary image. The obstacle in the reference image may be referred as a reference target, and the obstacle in the temporary image may be referred as a temporary target.

The third controller may be further configured for determining whether the reference image feature and the temporary image feature are consistent, extracting the reference scale information of the reference target from the reference image and extracting the temporary scale information of the temporary target from the temporary image when it is determined that the reference image feature and the temporary image feature are consistent, and adjusting the flying speed of the aircraft according to a relationship between the reference scale information and the temporary scale information. The specific manner of adjusting may be calculating a difference between the reference scale information and the temporary scale information when the temporary scale information is greater than the reference scale information, and reducing the flying speed of the aircraft if the absolute value of the difference is greater than a difference threshold.

Figure 21:
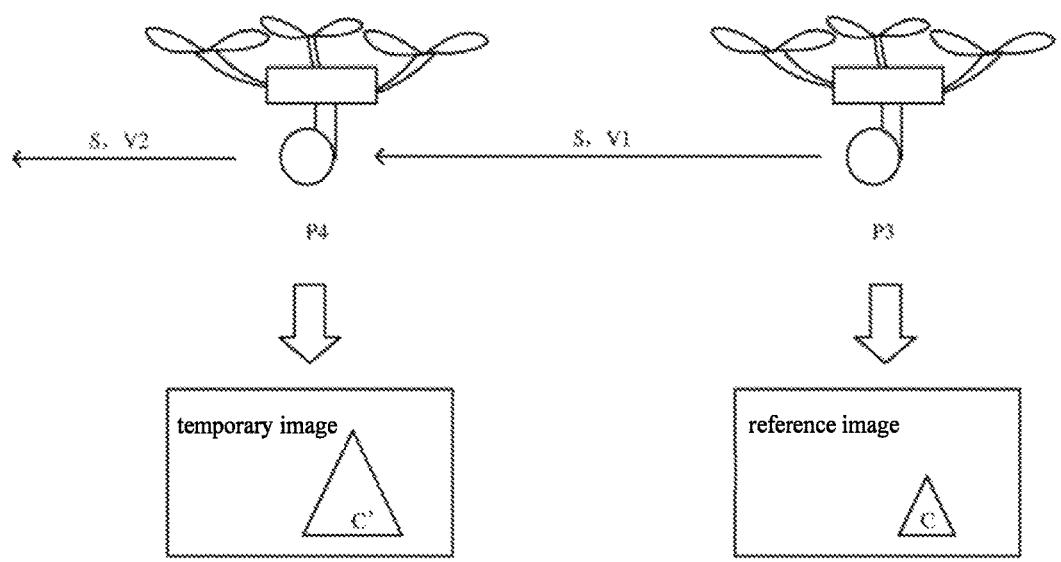
FIG. 21 is a schematic diagram of a further flying route of an aircraft and an image captured by an obstacle avoidance image capturing apparatus according to the first embodiment of the present invention.

The adjusting the flying speed by means of an image captured by the obstacle avoidance image capturing apparatus will be described below with reference to FIG. 21. As shown in FIG. 21, the aircraft may fly to a position P4 from a position P3 at the speed V1 in the direction indicated by the arrow S. The image below the position P3 is an image captured by the obstacle avoidance image capturing apparatus at the position P3, which is a reference image, and the obstacle C in the image is a reference target. The image below the position P4 is an image captured by the obstacle avoidance image capturing apparatus at the position P4, which is a temporary image, and the obstacle C' in the image is a temporary target. Whether the obstacle C and the obstacle C' are the same obstacle may be determined by extracting a reference image feature of the obstacle C and a temporary image feature of the obstacle C', and an image feature may be a shape, a color, or the like. Taking an image feature as a shape for an example, it is determined that the obstacle C and the obstacle C' may be the same obstacle if the shape of the obstacle C extracted from the reference image is the same as the shape of the obstacle C' extracted from the temporary image, and it is determined that the obstacle C and the obstacle C' may be different obstacles if the shape of the obstacle C extracted from the reference image is different from the shape of the obstacle C' extracted from the temporary image. Specifically, in FIG. 21, the shape of the obstacle C and the shape of the obstacle C' both are triangle, and thus the obstacle C and the shape of the obstacle C' may be the same obstacle. The reference scale information of the obstacle C' and the temporary scale information of the obstacle C may be further extracted, and the scale information may represent the size of the obstacle in the image, such as the side length of the obstacle, the area, and so on. If the temporary scale information is greater than the reference scale information and a difference between the reference scale information and the temporary scale information is greater than a difference threshold, then it is indicated that the aircraft may be in a process of gradually approaching the obstacle, so the aircraft may be controlled to decelerate, changing to fly at the speed V2 which is less than the speed V1.

In order to perform multi-directional obstacle avoidance, the navigation system may further include a plurality of obstacle avoidance image capturing apparatuses, which may be arranged in different directions of the gimbal body respectively, and may be configured for capturing images in different directions. In this case, the navigation system may be provided with a distance measurement module for each obstacle avoidance image capturing apparatus respectively, or all of the obstacle avoidance image capturing apparatuses may also share a distance measurement module which is rotatable and capable of measuring a distance in a plurality of directions.

The navigation system may further include a wireless sending module. The wireless sending module may be configured for transmitting an image captured by the obstacle avoidance image capturing apparatus to a remote controller for controlling the aircraft. The remote controller may display the received image so that an operator can see if there is an obstacle in front of the aircraft.

The third controller may be further configured for receiving a control signal from the remote controller and controlling the aircraft according to the control signal.

The aircraft of the first embodiment may include the navigation of any of the implementations of the first embodiment and other components of the existing aircraft. The navigation system may be arranged on the aircraft body and its specific position is not shown in the figures.

A Second Embodiment

Figure 22:
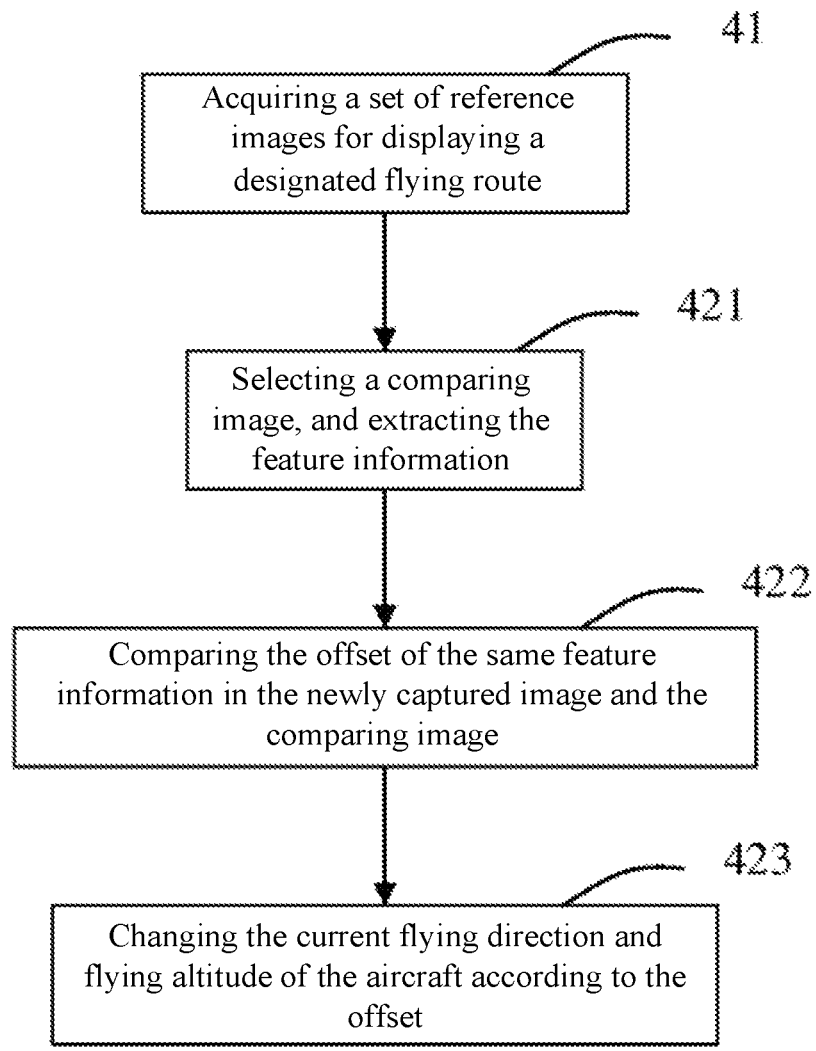
FIG. 22 is a flowchart of one implementation of a navigation method for an aircraft according to a second embodiment of the present invention.

The present embodiment provides a navigation method for an aircraft comprising a camera, the image capturing apparatus 15 is configured for capturing an image when the aircraft is flying; as shown in FIG. 22, the navigation method includes the following steps.

In step 41, a set of reference images for displaying a designated flying route may be acquired. The reference images may be topographic maps of the designated flying route. The designated flying route may include a return route for the aircraft, and a topographic map of the return route may be captured by the image capturing apparatus 15 when the aircraft is on the outward voyage. The designated flying route may further include any route that specifies a starting point and an ending point, and for such designated flying route, the navigation method may obtain a corresponding reference image by pre-storing or downloading via the network.

In step 42, a newly captured image may be compared with the set of reference images when the aircraft is flying, and the current flying route of the aircraft may be corrected. The step 42 may include the following steps.

In step 421, a reference image may be selected from the set of reference images as a comparing image, and the feature information may be extracted from a newly captured image and the comparing image respectively. More specifically, the feature information of each of the set of reference images may be extracted and a reference image having the largest amount of same feature information as the newly captured image may be selected as the comparing image.

In step 422, the offset of the same feature information in the newly captured image and the comparing image may be compared.

In step 423, the current flying direction and flying altitude of the aircraft may be changed according to the offset.

Figure 23:
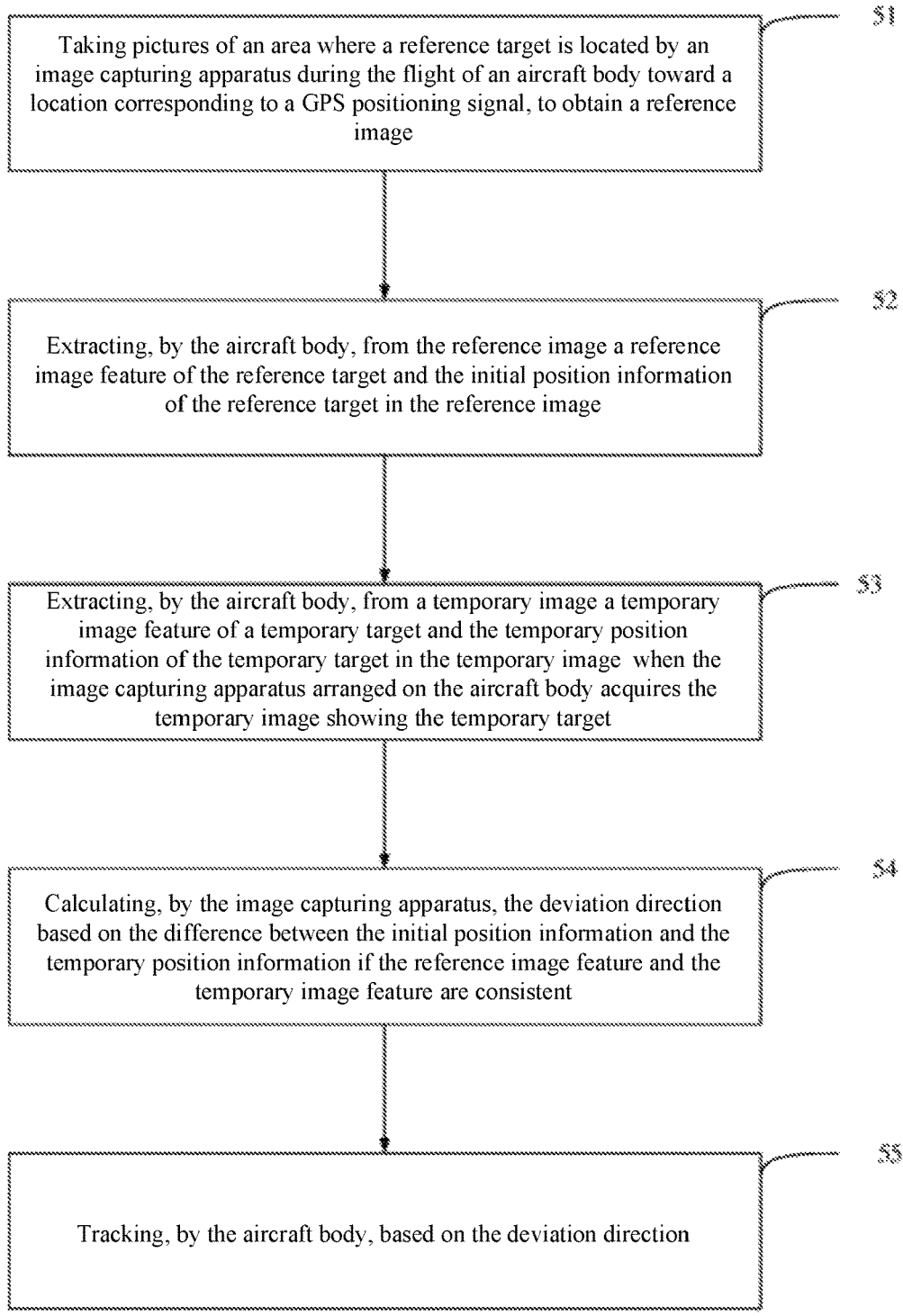
FIG. 23 is a flowchart of another implementation of a navigation method for an aircraft according to the second embodiment of the present invention.

In another implementation of the embodiments of the present invention, a navigation method suitable for target tracking of the aircraft may be provided, and a target tracking method suitable for the aircraft may be applied to the tracking aircraft. The navigation method may further include: receiving a GPS positioning signal at a location; the aircraft body flying toward a location corresponding to a GPS positioning signal. As shown in FIG. 23, the navigation method may include the following steps.

In step 51, since a GPS signal receiver may be arranged on a target to be tracked, the GPS signal receiver may acquire the latitude and longitude coordinates returned from a GPS system and may forward them. If the aircraft body is initiated, it may acquire the latitude and longitude coordinates forwarded by the GPS signal receiver. The aircraft body may fly toward a location corresponding to the GPS positioning signal according to the latitude and longitude coordinates, and during the flight, the image capturing apparatus may take pictures of an area where a reference target is located to obtain a reference image.

In step 52, the image capturing apparatus may extract from the reference image a reference image feature of the reference target and the initial position information of the reference target in the reference image, and the reference target may be at a position of a certain point of the reference image. In practice, the coordinate values of the point in the coordinate system established based on the reference image may be denoted as the initial position information. Similarly, the temporary position information described hereinafter may be a certain point of a temporary target in a temporary image, and in practice, the coordinate values of the point in the coordinate system established based on the temporary image may be denoted as the temporary position information. In addition, the reference image feature and the initial position information may be initialized in the aircraft body. The reference image feature may be used as a reference feature for subsequent selection of a target to be tracked, and a target consistent with the reference feature may be recorded as a target to be tracked. The initial position information may be used as a reference point of a target to be tracked in an image captured by the image capturing apparatus. The coordinate system of the reference image is the same as that of the temporary image, and in the present invention, the vertex at the upper left corner of the reference image is the coordinate origin. The part on the right of the coordinate origin is the positive axis of the x-axis, and the part below the coordinate origin is the positive axis of the y-axis, and the size of the coordinates may be calculated in a pixel as the smallest unit. When a target to be tracked deviates from the reference point, the aircraft body may be controlled to rotate to achieve the transformation of the image capturing angle of the image capturing apparatus and to cause the target to be tracked to return to the position of the reference point again. In practice, the background subtraction technology and the like may be used to extract the gray, color and other information of the reference target, the interference caused by the noise, pseudo-target and the like may be eliminated through the threshold processing, morphological operation and other techniques, and then the reference image feature and the initial position information of the reference target may be obtained through the contour extraction technology and the like.

In step 53, since the image capturing apparatus takes pictures in real time during the flight, a temporary image feature of the temporary target and the temporary position information of the temporary target in the temporary image may be extracted from the temporary image when the image capturing apparatus acquires the temporary image showing the temporary target. Temporary image features may include, but not limited to, the gray, color, shape or the like of the temporary target. In practice, a temporary image feature of a temporary target may be extracted selectively according to the usage scenario.

In step 54, if the reference image feature and the temporary image feature are consistent (for example, it is assumed that the color and shape information of the reference target may be extracted in the reference image, and the color and shape information of the temporary target may be extracted in the temporary image, and only if the color of the temporary target is consistent with the color of the reference target, and the shape of the temporary target is consistent with the shape of the reference target), it is determined that the temporary target is the target to be tracked. The image capturing apparatus may calculate the deviation direction based on the difference between the initial position information and the temporary position information, that is, may calculate the difference between a horizontal coordinate of the initial position information (i.e., the abscissa of the initial position information) and a horizontal coordinate of the temporary position information (i.e., the abscissa of the temporary position information) and the difference between a vertical coordinate of the initial position information (i.e., the ordinate of the initial position information) and a vertical coordinate of the temporary position information (i.e., the ordinate of the temporary position information), and determine the deviation direction based on the two differences. The aircraft body may continue to track the temporary target based on the deviation direction so that the difference between the initial position information and the temporary position information may reduce gradually. For example, if the temporary position information deviates a certain distance to the right relative to the initial position information, the aircraft body may fly toward to the right side so that the temporary position information may gradually approach to the initial position information. The temporary image features of an target may include but not limited to gradient direction histogram, local binary pattern histogram, scale invariant feature transformation and accelerated robust feature, that is, a template matching method, a histogram matching method or a FLANN-based matching method may be used to lock a temporary target to be the target to be tracked.

In step 55, the aircraft body may track based on the deviation direction.

In addition, since targets to be tracked by the aircraft body may include static targets and dynamic targets, it is necessary for the aircraft body to keep a reasonable distance from a target in order to avoid collision of the aircraft body with the target while avoiding losing track of the target. When the aircraft body is too close to a temporary target, the scale of the target in an image captured by the image capturing apparatus may become larger, and when the aircraft body is too far from a temporary target, the scale of the target in an image captured by the image capturing apparatus may become smaller. By controlling the aircraft body to increase or reduce its flying speed, the distance between the aircraft body and a temporary target may conform to the following constraint: $0.9*Z<X<1.1*Z$, where Z may be a preset threshold, and X may be the distance between the aircraft body and a temporary target. For example, a vehicle is moving forward at a constant speed, and an aircraft may be responsible for tracking the vehicle and may keep a distance of 500 meters from the vehicle, wherein 500 meters is a preset threshold.

The aircraft body may determine the distance from the vehicle according to a change in a width value and a height value of a temporary target in a temporary image, wherein the width value may refer to a horizontal length value of the temporary target in the temporary image, and the height value may refer to a longitudinal length value of the temporary target in the temporary image. In the present embodiment, the image capturing apparatus may extract the first reference scale information and the second reference scale information of the reference target from the reference image, wherein the first reference scale information may be a width value of the reference target in the reference image, and the second reference scale information may be a height value of the reference target in the reference image.

When the image capturing apparatus determines that the reference image feature is consistent with the temporary image feature, the image capturing apparatus may extract the first temporary scale information and the second temporary scale information of the temporary target from the temporary image, wherein the first temporary scale information may be a width value of the temporary target in the temporary image, and the second temporary scale information may be a height value of the temporary target in the temporary image.

When the value of the first reference scale information is larger than the value of the first temporary scale information, the image capturing apparatus may calculate a difference between the first reference scale information and the first temporary scale information, and if the absolute value of the difference is larger than a preset threshold, the aircraft body may increase its flying speed.

When the value of the first reference scale information is smaller than the value of the first temporary scale information, the image capturing apparatus may calculate a difference between the first reference scale information and the first temporary scale information, and if the absolute value of the difference is larger than a preset threshold, the aircraft body may reduce its flying speed.

When the value of the second reference scale information is larger than the value of the second temporary scale information, the image capturing apparatus may calculate a difference between the second reference scale information and the second temporary scale information, and if the absolute value of the difference is larger than a preset threshold, the aircraft body may increase its flying speed.

When the value of the second reference scale information is smaller than the value of the second temporary scale information, the image capturing apparatus may calculate a difference between the second reference scale information and the second temporary scale information, and if the absolute value of the difference is larger than a preset threshold, the aircraft body may reduce its flying speed.

When a position of the temporary target captured by the image capturing apparatus in the temporary image is located away from the reference point, it is necessary to adjust the flying direction of the aircraft body in time. The position of the temporary target in the temporary image may always be kept at the reference point by the adjustment of the flying direction. Therefore the target tracking method suitable for the aircraft may also include the following steps.

When the image capturing apparatus determines that a temporary vertical coordinate of the temporary position information (i.e., the temporary ordinate of the temporary position information) is not consistent with an initial vertical coordinate of the initial position information (i.e., the initial ordinate of the initial position information), a difference between a temporary vertical coordinate and an initial vertical coordinate may be calculated to generate longitudinal displacement information, wherein the initial vertical coordinate may be a position coordinate acquired by the image capturing apparatus in the coordinate system established based on the reference image, and the temporary vertical coordinate may be a position coordinate acquired by the image capturing apparatus in the coordinate system established based on the temporary image.

The pitch axis of the gimbal may be rotated according to the longitudinal displacement information to adjust a vertical angle of the image capturing apparatus for capturing a temporary image.

When a temporary horizontal coordinate of the temporary position information is not consistent with an initial horizontal coordinate of the initial position information, a difference between the temporary horizontal coordinate and the initial horizontal coordinate may be calculated to generate lateral displacement information, wherein the initial horizontal coordinate may be a position coordinate acquired by the image capturing apparatus in the coordinate system established based on the reference image, the temporary horizontal coordinate may be a position coordinate acquired by the image capturing apparatus in the coordinate system established based on the temporary image.

The yaw axis of the gimbal may be rotated according to the lateral displacement information to adjust a horizontal angle of the image capturing apparatus for capturing a temporary image.

In another implementation, the pitch axis and yaw axis of the gimbal may be rotated simultaneously so that the temporary vertical coordinate and the temporary horizontal coordinate may change simultaneously.

Further, in the process of tracking a temporary target by the aircraft body, the temporary target may be subject to deformation, a color change or the like due to its own reasons or external reasons. The temporary image features of the target including but not limited to gradient direction histogram, local binary pattern histogram, scale invariant feature transformation, and accelerated robust feature may change. In this case, the present invention employs a method of establishing a target group and updating a temporary image feature, or the like.

The image capturing apparatus may search for a similar target in real time in a temporary image and extract a reference feature of a similar target. When the reference feature is consistent with one of the temporary image features, for example, the color of the similar target is the same as the color of the temporary target, or the color and shape of the similar target are the same as the color and shape of the temporary target respectively, then the similar target may be regarded as a candidate target in the target group.

When the aircraft body detects a change in any of the temporary image feature, the temporary position information, the first temporary scale information, and the second temporary scale information, the temporary image feature, the temporary position information, the first temporary scale information, and the second temporary scale information after the change may be used to update the temporary image feature, the temporary location information, the first temporary scale information, and the second temporary scale information before the change respectively, to eliminate or reduce the interference with the tracking system due to factors such as a target appearance change or occlusion and so on, and thus to improve the stability of the tracking system and the accuracy of the tracking results.

In order to facilitate an operator to view, in the present invention, the position information and the scale information of the candidate target or the temporary target tracked by the aircraft body may be selectively displayed on the image capturing apparatus (the image capturing apparatus may have a display function). In one embodiment, the image capturing apparatus may be connected to a display, and the display may be used to display the position information and the scale information of the candidate target or the temporary target.

The image capturing apparatus may acquire and calculate the provisional coordinate information, the first provisional scale information and the second provisional scale information of the similar target, wherein the first provisional scale information may be a width value of the similar target in the temporary image, and the second provisional scale information may be a height value of the similar target in the temporary image.

When the image capturing apparatus detects a target group and the image capturing apparatus tracks a temporary target, the provisional coordinate information, the first provisional scale information, and the second provisional scale information of the target group may be weighted with the temporary position information, the first temporary scale Information and second temporary scale information of the temporary target respectively, and the result of the weighting calculation may be output to the image capturing apparatus to display the result of the weighting calculation.

As an example of tracking a vehicle by the aircraft, when there is more than one vehicle in front of the aircraft and the colors of the vehicles are the same, the vehicles other than a temporary target may be classified into a target group. In this case, the provisional coordinate information, the first provisional scale information, and the second provisional scale information of each vehicle in the target group may be weighted with the temporary position information, the first temporary scale information and the second temporary scale information of the temporary target, namely the vehicle to be tracked, respectively, and the result of the weighting calculation may be output to the image capturing apparatus to display the result of the weighting calculation.

When the image capturing apparatus does not detect a target group and the image capturing apparatus tracks a temporary target, the temporary position information, the first temporary scale information, and the second temporary scale information of the temporary target may be output to the image capturing apparatus to display the temporary position information, the first temporary scale information and the second temporary scale information.

As an example of tracking a vehicle by the aircraft, when there is only one vehicle in front of the aircraft, the vehicle is a temporary target. The temporary position information, the first temporary scale information, and the second temporary scale information of the vehicle may be output to the image capturing apparatus to display the temporary position information, the first temporary scale information, and the second temporary scale information.

When the image capturing apparatus detects a target group and the image capturing apparatus does not track a temporary target, the provisional coordinate information, the first provisional scale information, and the second provisional scale information of the target group may be weighted respectively, and the result of the weighting calculation may be output to the image capturing apparatus to display the result of the weighting calculation.

As an example of tracking a vehicle by the aircraft, when there are a plurality of vehicles in front of the aircraft but none of them is a temporary target, and one of the features of the vehicles is the same as that of the vehicle to be tracked, the plurality of vehicles may be classified into a target group. In this case, the provisional coordinate information, the first provisional scale information, and the second provisional scale information of each vehicle in the target group may be weighted respectively, and the result of the weighting calculation may be output to the image capturing apparatus to display the result of the weighting calculation. When the image capturing apparatus does not detect a target group and the image capturing apparatus does not track a temporary target, no information will be output to the image capturing apparatus.

The above results output to the image capturing apparatus may also be displayed on the display so that an operator can view the details of tracking a target by the aircraft in real time.

For example, the aircraft body may track a bird. The bird to be tracked may receive a GPS signal. If the aircraft body is initiated, the aircraft body may fly toward a location corresponding to the GPS positioning signal, and during the flight, the image capturing apparatus may take pictures of an area where the bird is located to obtain a reference image. The image capturing apparatus may extract a reference image feature of a reference target from the reference image, for example, the size and the color of the bird, and the like, and may extract the initial position information of the reference target in the reference image. It is assumed that the bird is located at the center point of the reference image. The aircraft body may take pictures during the flight. When the image capturing apparatus acquires a temporary image showing a temporary target, a temporary image feature of the temporary target and the temporary position information of the temporary target in the temporary image may be extracted from the temporary image. When the reference image feature and the temporary image feature are consistent, the image capturing apparatus may calculate the deviation direction based on the difference between the initial position information and the temporary position information. The aircraft body may track based on the deviation direction. In addition, the image capturing apparatus may extract a width value and a height value of the reference target from the reference image. When the image capturing apparatus determines that the reference image feature and the temporary image feature are consistent, that is, the temporary target is the bird to be tracked, the image capturing apparatus may extract a width value and a height value of the bird from the temporary image. When the width value and the height value of the reference target are inconsistent with the width value and the height value of the bird extracted in the temporary image, it may show that the distance between the aircraft body and the bird may deviate from a preset threshold. For example, if the width value of the reference target is greater than the width value of the bird extracted from the temporary image, it may show that the distance between the aircraft body and the bird may be larger than a threshold, therefore the aircraft body may increase its flying speed so that the distance between the aircraft body and the temporary target may be kept within a threshold range. The threshold range may be set between 0.9*threshold and 1.1*threshold in the present invention. When the temporary target deviates from the center point of the reference image, the image capturing apparatus may calculate a difference between a temporary vertical coordinate and an initial vertical coordinate and generate longitudinal displacement information, and the pitch axis of the aircraft body may be rotated according to the longitudinal displacement information to adjust a vertical angle of the image capturing apparatus for capturing a temporary image. Thereafter, the image capturing apparatus may calculate a difference between a temporary horizontal coordinate and an initial horizontal coordinate and generate lateral displacement information, and the yaw axis of the aircraft body may be rotated according to the lateral displacement information to adjust a horizontal angle of the image capturing apparatus for capturing a temporary image. In this way, by adjusting the aircraft body, the flying direction of the aircraft body may direct toward the bird to be tracked in real time, while in the temporary image acquired by the image capturing apparatus, the bird may be kept at the center point of the reference image, and thus it is convenient for viewing, while avoiding losing track of the target.

Figure 24:
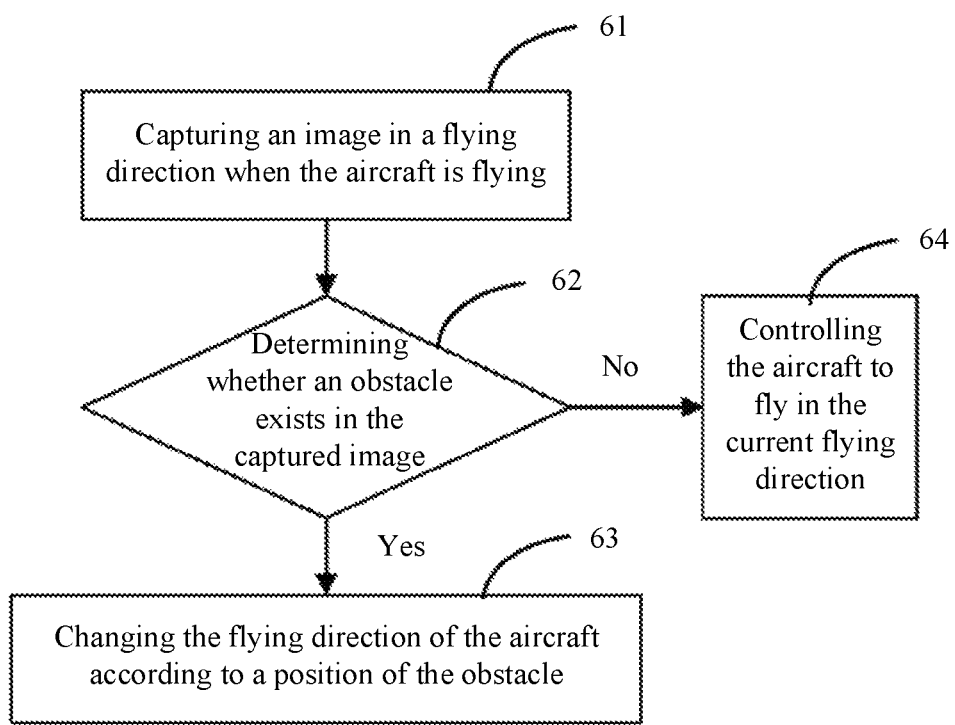
FIG. 24 is a flowchart of yet another implementation of a navigation method for an aircraft according to the second embodiment of the present invention.

In another implementation of the present embodiment, as shown in FIG. 24, the navigation system may further comprises the following steps.

In step 61, an image in a flying direction may be captured when the aircraft is flying.

In step 62, whether an obstacle exists in the captured image may be determined, and if yes, then step 63 may be performed, and if not, then step 64 may be performed.

In step 63, the flying direction of the aircraft may be changed according to a position of the obstacle.

In step 64, the aircraft may be controlled to fly in the current flying direction.

Figure 25:
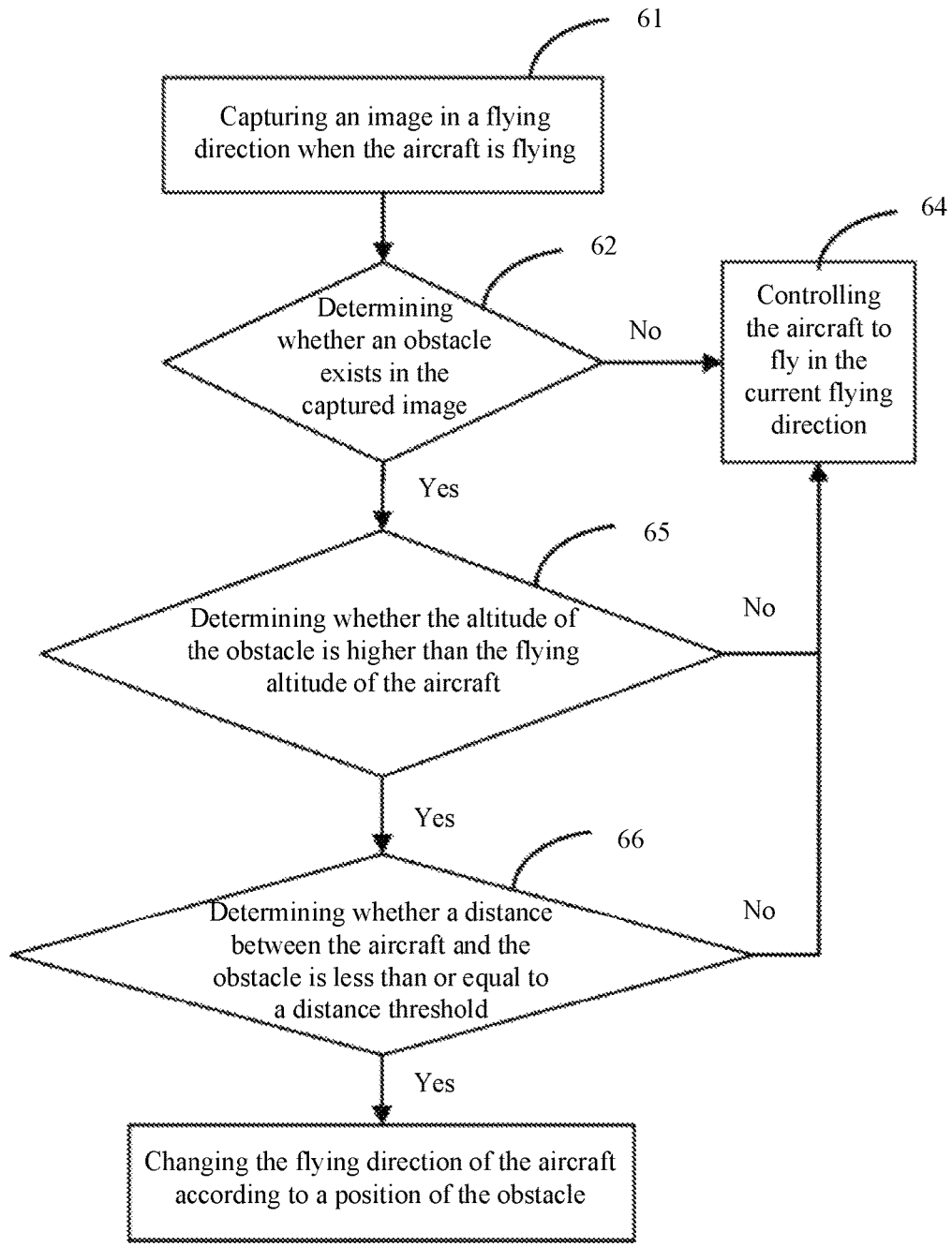
FIG. 25 is a flowchart of a further implementation of a navigation method for an aircraft according to the second embodiment of the present invention.

In order to avoid frequent adjustments of the flying condition of the aircraft and to enable the navigation system to determine a position of an obstacle more accurately, as shown in FIG. 25, the navigation method may further include performing the following step 65 when it is determined that an obstacle exists in the captured image: determining whether the altitude of the obstacle is higher than the flying altitude of the aircraft, and if yes, performing step 66, and if not, performing step 64.

In step 66, a distance between the aircraft and the obstacle may be detected, and the flying altitude of the aircraft may be increased if the distance is less than or equal to a distance threshold, and step 64 may be performed if the distance is greater than the distance threshold.

In addition, the navigation method may further include the following steps: transmitting the captured image to a remote controller for controlling the aircraft, receiving a control signal from the remote controller and controlling the aircraft according to the control signal.

By using the navigation method, an operator may determine from an image in front of the aircraft which is displayed from the remote controller whether it is necessary to avoid the obstacle. And if necessary, the operator may further manually control the aircraft through the remote controller to adjust so as to pass through the front area safely.

In another implementation of the navigation method of the second embodiment, the obstacle avoidance method may also be used to adjust the flying speed of the aircraft in order to prevent the aircraft from colliding with an obstacle. Two specific ways to adjust the flying speed are provided below.

The first way is to adjust the flying speed by detecting a distance between the aircraft and the obstacle by means of a distance measurement module. It may include the following specific steps: detecting a distance between the aircraft and an obstacle when it is determined that the obstacle exists in the image captured by the obstacle avoidance image capturing apparatus, and adjusting the flying speed of the aircraft according to a relationship between the distance and a preset threshold. The adjusting the flying speed of the aircraft according to a relationship between the distance and a preset threshold may include reducing the flying speed of the aircraft when the distance is less than or equal to the preset threshold. The preset threshold may be set freely, and its specific numerical size may be considered in conjunction with the distance threshold.

The second way is to adjust the flying speed by means of an image captured by the image capturing apparatus. It may include the following specific steps: extracting a reference image feature of a reference target from a reference image and extracting a temporary image feature of a temporary target from a temporary image when it is determined that the obstacle exists in the image captured by the obstacle avoidance image capturing apparatus. The temporary image is an image, among the image captured by the obstacle avoidance image capturing apparatus, where an obstacle exists and whose capture time is closest to the current time, that is, a newly captured image where an obstacle exists. The reference image is an image, among the image captured by the obstacle avoidance image capturing apparatus, where an obstacle exists and whose capture time is prior to the capture time of the temporary image. The obstacle in the reference image may be referred as a reference target, and the obstacle in the temporary image may be referred as a temporary target.

It may further include the following specific steps: determining whether the reference image feature and the temporary image feature are consistent, extracting the reference scale information of the reference target from the reference image and extracting the temporary scale information of the temporary target from the temporary image when it is determined that the reference image feature and the temporary image feature are consistent, and adjusting the flying speed of the aircraft according to a relationship between the reference scale information and the temporary scale information. The specific manner of adjusting may be calculating a difference between the reference scale information and the temporary scale information when the temporary scale information is greater than the reference scale information, and reducing the flying speed of the aircraft if the absolute value of the difference is greater than a difference threshold.

In another implementation of the obstacle avoidance method of the second embodiment, the aircraft may include a plurality of obstacle avoidance image capturing apparatuses, which may be arranged in different directions of the gimbal body respectively, and may be configured for capturing images in different directions. One of the plurality of obstacle avoidance image capturing apparatuses may be configured for capturing an image in a flying direction when the aircraft is flying.

The obstacle avoidance method may further include: splicing the images captured by these obstacle avoidance image capturing apparatuses into a panoramic image. The navigation system can observe the circumstances around the aircraft in all directions through the panoramic image.

While specific embodiments of the present invention have been described above, it should be understood by those skilled in the art that these are merely illustrative and that various changes or modifications may be made to these embodiments without departing from the principle and essence of the present invention. Accordingly, the scope of the present invention is defined by the appended claims.

What is claimed is:

1. An aircraft, comprising a navigation system, the navigation system comprises a camera and a controller;
   wherein an image capturing apparatus of the camera is configured for capturing an image when the aircraft is flying; the controller comprises an acquisition module and a correction module;
   the acquisition module is configured for acquiring a set of reference images for displaying a designated flying route;
   the correction module is configured for comparing an image newly captured by the image capturing apparatus with the set of reference images when the aircraft is flying, and correcting the current flying route of the aircraft,
   wherein the aircraft flies toward a location corresponding to a GPS positioning signal, and during the flight of the aircraft toward the location, the image capturing apparatus takes pictures of an area where a reference target is located to obtain a reference image, and an aircraft body of the aircraft extracts from the reference image initial position information of the reference target in the reference image, if the image capturing apparatus arranged on the aircraft body acquires a temporary image showing a temporary target, the aircraft body extracts from the temporary image temporary position information of the temporary target in the temporary image, the image capturing apparatus searches for a similar target in real time in the temporary image and extract a reference feature of the similar target, and if the reference feature is consistent with one of a plurality of temporary image features of the temporary target, the similar target is regarded as a candidate target in a target group, the image capturing apparatus acquires and calculates provisional coordinate information, first provisional scale information and second provisional scale information of the similar target, wherein the first and second provisional scale information are a width and height value of the similar target in the temporary image respectively;

if the image capturing apparatus detects the target group and the image capturing apparatus tracks the temporary target, the provisional coordinate information, the first provisional scale information, and the second provisional scale information of all the candidate targets in the target group are weighted with the temporary position information, first temporary scale information and second temporary scale information of the temporary target respectively, and the result of the weighting calculation is output to the image capturing apparatus to display the result of the weighting calculation.

2. The aircraft of claim 1, wherein the acquisition module is configured for acquiring a topographic map of the designated flying route and using the topographic map as a reference image.

3. The aircraft of claim 2, wherein the designated flying route comprises a return route for the aircraft, and a topographic map of the return route is captured by the image capturing apparatus when the aircraft is on the outward voyage.

4. The aircraft of claim 1, wherein the correction module comprises an image processing module, a comparison module, and a flying control module;

the image processing module is configured for selecting a reference image from the set of reference images as a comparing image, and extracting the feature information from a newly captured image and the comparing image respectively;

the comparison module is configured for comparing the offset of the same feature information in the newly captured image and the comparing image;

the flying control module is configured for changing the current flying direction of the aircraft according to the offset.

5. The aircraft of claim 4, wherein the image processing module is configured for extracting the feature information of each of the set of reference images and selecting a reference image having the largest amount of same feature information as the newly captured image as the comparing image.

6. The aircraft of claim 1, wherein the navigation system further comprises a GPS positioning unit configured for receiving a GPS positioning signal at a location;

the aircraft body extracts from the reference image a reference image feature of the reference target;

if the image capturing apparatus arranged on the aircraft body acquires the temporary image showing the temporary target, the aircraft body extracts from the temporary image a temporary image feature of the temporary target;

if the reference image feature and the temporary image feature are consistent, the image capturing apparatus calculates the deviation direction based on the difference between the initial position information and the temporary position information;

the aircraft body tracks based on the deviation direction.

7. The aircraft of claim 6, wherein:

the image capturing apparatus extracts first reference scale information and second reference scale information of the reference target from the reference image, wherein the first reference scale information is a width value of the reference target in the reference image, and the second reference scale information is a height value of the reference target in the reference image;

if the image capturing apparatus determines that the reference image feature is consistent with the temporary image feature, the image capturing apparatus extracts the first temporary scale information and the second temporary scale information of the temporary target from the temporary image, wherein the first temporary scale information is a width value of the temporary target in the temporary image, and the second temporary scale information is a height value of the temporary target in the temporary image;

if the value of the first reference scale information is larger than the value of the first temporary scale information, the image capturing apparatus calculates a difference between the first reference scale information and the first temporary scale information, and if the absolute value of the difference is larger than a preset threshold, the aircraft body increases its flying speed;

if the value of the first reference scale information is smaller than the value of the first temporary scale information, the image capturing apparatus calculates a difference between the first reference scale information and the first temporary scale information, and if the absolute value of the difference is larger than a preset threshold, the aircraft body reduces its flying speed;

if the value of the second reference scale information is larger than the value of the second temporary scale information, the image capturing apparatus calculates a difference between the second reference scale information and the second temporary scale information, and if the absolute value of the difference is larger than a preset threshold, the aircraft body increases its flying speed;

if the value of the second reference scale information is smaller than the value of the second temporary scale information, the image capturing apparatus calculates a difference between the second reference scale information and the second temporary scale information, and if the absolute value of the difference is larger than a preset threshold, the aircraft body reduces its flying speed.

8. The aircraft of claim 6, wherein:

the distance between the aircraft body and the temporary target conforms to the following constraint: $0.9*Z<X<1.1*Z$, where Z is a preset threshold, and X is the distance between the aircraft body and the temporary target.

9. The aircraft of claim 8, wherein:
if a temporary vertical coordinate of the temporary position information is not consistent with an initial vertical coordinate of the initial position information, the aircraft body calculates a difference between the temporary vertical coordinate and the initial vertical coordinate and generates longitudinal displacement information, wherein the initial vertical coordinate is a position coordinate of the reference target in the coordinate system established based on the reference image, and the temporary vertical coordinate is a position coordinate of the temporary target in the coordinate system established based on the temporary image;
the aircraft body adjusts a vertical angle of the image capturing apparatus for capturing the temporary image.

10. The aircraft of claim 9, wherein:
if a temporary horizontal coordinate of the temporary position information is not consistent with an initial horizontal coordinate of the initial position information, the aircraft body calculates a difference between the temporary horizontal coordinate and the initial horizontal coordinate and generates lateral displacement information, wherein the initial horizontal coordinate is a position coordinate of the reference target in the coordinate system established based on the reference image, the temporary horizontal coordinate is a position coordinate of the temporary target in the coordinate system established based on the temporary image;
the aircraft body adjusts a horizontal angle of the image capturing apparatus for capturing the temporary image.

11. The aircraft of claim 6, wherein:
if the aircraft body detects a change in any of the temporary image feature, the temporary position information, the first temporary scale information, and the second temporary scale information, the temporary image feature, the temporary position information, the first temporary scale information, and the second temporary scale information after the change are used to update the temporary image feature, the temporary location information, the first temporary scale information, and the second temporary scale information before the change respectively.

12. The aircraft of claim 1, wherein:
if the image capturing apparatus does not detect the target group and the image capturing apparatus tracks the temporary target, the temporary position information, the first temporary scale information, and the second temporary scale information of the temporary target are output to the image capturing apparatus to display the temporary position information, the first temporary scale information and the second temporary scale information;
if the image capturing apparatus detects the target group and the image capturing apparatus does not track the temporary target, the provisional coordinate information, the first provisional scale information, and the second provisional scale information of all the candidate targets in the target group are weighted respectively, and the result of the weighting calculation are output to the image capturing apparatus to display the result of the weighting calculation;
if the image capturing apparatus does not detect the target group and the image capturing apparatus does not track the temporary target, no information is output to the image capturing apparatus.

13. A navigation method for an aircraft comprising a camera, an image capturing apparatus of the camera is configured for capturing an image when the aircraft is flying;
wherein the navigation method comprises:
a step $S_1$ of acquiring a set of reference images for displaying a designated flying route;
a step $S_2$ of comparing an image newly captured by the image capturing apparatus with the set of reference images when the aircraft is flying, and correcting the current flying route of the aircraft,
wherein the aircraft flies toward a location corresponding to a GPS positioning signal, and the navigation method further comprises: during the flight of the aircraft toward the location, taking pictures, by the image capturing apparatus, of an area where a reference target is located to obtain a reference image; extracting, by an aircraft body of the aircraft, from the reference image initial position information of the reference target in the reference image; and if the image capturing apparatus arranged on the aircraft body acquires a temporary image showing a temporary target, extracting, by the aircraft body, from the temporary image temporary position information of the temporary target in the temporary image;
wherein the navigation method further comprises: searching for, by the image capturing apparatus, a similar target in real time in the temporary image and extracting a reference feature of the similar target, and if the reference feature is consistent with one of a plurality of temporary image features of the temporary target, regarding the similar target as a candidate target in a target group,
wherein the navigation method further comprises: acquiring and calculating, by the image capturing apparatus, provisional coordinate information, first provisional scale information and second provisional scale information of the similar target, wherein the first and second provisional scale information are a width and height value of the similar target in the temporary image respectively; and if the image capturing apparatus detects the target group and the image capturing apparatus tracks the temporary target, weighting the provisional coordinate information, the first provisional scale information, and the second provisional scale information of all the candidate targets in the target group with the temporary position information, first temporary scale information and second temporary scale information of the temporary target respectively, and outputting the result of the weighting calculation to the image capturing apparatus to display the result of the weighting calculation.

14. The navigation method of claim 13, wherein the step $S_2$ comprises:
a step $S_{21}$ of selecting a reference image from the set of reference images as a comparing image, and extracting the feature information from a newly captured image and the comparing image respectively;
a step $S_{22}$ of comparing the offset of the same feature information in the newly captured image and the comparing image;
a step $S_{23}$ of changing the current flying direction of the aircraft according to the offset.

15. The navigation method of claim 14, wherein the step $S_{21}$ comprises: extracting the feature information of each of the set of reference images and selecting a reference image having the largest amount of same feature information as the newly captured image as the comparing image.

16. The navigation method of claim 13, wherein the navigation method further comprises:
- receiving a GPS positioning signal at a location;
- extracting, by the aircraft body, from the reference image a reference image feature of the reference target;
- if the image capturing apparatus arranged on the aircraft body acquires the temporary image showing the temporary target, extracting, by the aircraft body, from the temporary image a temporary image feature of the temporary target;
- if the reference image feature and the temporary image feature are consistent, calculating, by the image capturing apparatus, the deviation direction based on the difference between the initial position information and the temporary position information;
- tracking, by the aircraft body, based on the deviation direction.

17. The navigation method of claim 16, wherein the navigation method further comprises:
- extracting, by the image capturing apparatus, first reference scale information and second reference scale information of the reference target from the reference image, wherein the first reference scale information is a width value of the reference target in the reference image, and the second reference scale information is a height value of the reference target in the reference image;
- if the image capturing apparatus determines that the reference image feature is consistent with the temporary image feature, extracting, by the image capturing apparatus, the first temporary scale information and the second temporary scale information of the temporary target from the temporary image, wherein the first temporary scale information is a width value of the temporary target in the temporary image, and the second temporary scale information is a height value of the temporary target in the temporary image;
- if the value of the first reference scale information is larger than the value of the first temporary scale information, calculating, by the image capturing apparatus, a difference between the first reference scale information and the first temporary scale information, and if the absolute value of the difference is larger than a preset threshold, increasing, by the aircraft body, its flying speed;
- if the value of the first reference scale information is smaller than the value of the first temporary scale information, calculating, by the image capturing apparatus, a difference between the first reference scale information and the first temporary scale information, and if the absolute value of the difference is larger than a preset threshold, reducing, by the aircraft body, its flying speed;
- if the value of the second reference scale information is larger than the value of the second temporary scale information, calculating, by the image capturing apparatus, a difference between the second reference scale information and the second temporary scale information, and if the absolute value of the difference is larger than a preset threshold, increasing, by the aircraft body, its flying speed;
- if the value of the second reference scale information is smaller than the value of the second temporary scale information, calculating, by the image capturing apparatus, a difference between the second reference scale information and the second temporary scale information, and if the absolute value of the difference is larger than a preset threshold, reducing, by the aircraft body, its flying speed.

18. The navigation method of claim 17, wherein the navigation method further comprises:
- the distance between the aircraft body and the temporary target conforming to the following constraint: $0.9*Z<X<1.1*Z$, where Z is a preset threshold, and X is the distance between the aircraft body and the temporary target.

19. The navigation method of claim 18, wherein the navigation method further comprises:
- if a temporary vertical coordinate of the temporary position information is not consistent with an initial vertical coordinate of the initial position information, calculating, by the aircraft body, a difference between the temporary vertical coordinate and the initial vertical coordinate and generates longitudinal displacement information, wherein the initial vertical coordinate is a position coordinate of the reference target in the coordinate system established based on the reference image, and the temporary vertical coordinate is a position coordinate of the temporary target in the coordinate system established based on the temporary image;
- adjusting, by the aircraft body, a vertical angle of the image capturing apparatus for capturing the temporary image.

20. The navigation method of claim 19, wherein the navigation method further comprises:
- if a temporary horizontal coordinate of the temporary position information is not consistent with an initial horizontal coordinate of the initial position information, calculating, by the aircraft body, a difference between the temporary horizontal coordinate and the initial horizontal coordinate and generates lateral displacement information, wherein the initial horizontal coordinate is a position coordinate of the reference target in the coordinate system established based on the reference image, the temporary horizontal coordinate is a position coordinate of the temporary target in the coordinate system established based on the temporary image;
- adjusting, by the aircraft body, a horizontal angle of the image capturing apparatus for capturing the temporary image.

21. The navigation method of claim 16, wherein the navigation method further comprises:
- if the aircraft body detects a change in any of the temporary image feature, using the temporary position information, the first temporary scale information, and the second temporary scale information, the temporary image feature, the temporary position information, the first temporary scale information, and the second temporary scale information after the change to update the temporary image feature, the temporary location information, the first temporary scale information, and the second temporary scale information before the change respectively.

22. The navigation method of claim 13, wherein the navigation method further comprises:
- if the image capturing apparatus does not detect the target group and the image capturing apparatus tracks the temporary target, outputting the temporary position information, the first temporary scale information, and the second temporary scale information of the temporary target to the image capturing apparatus to display the temporary position information, the first temporary scale information and the second temporary scale information;

if the image capturing apparatus detects the target group and the image capturing apparatus does not track the temporary target, weighting the provisional coordinate information, the first provisional scale information, and the second provisional scale information of all the candidate targets in the target group respectively, and outputting the result of the weighting calculation to the image capturing apparatus to display the result of the weighting calculation;

if the image capturing apparatus does not detect the target group and the image capturing apparatus does not track the temporary target, outputting no information to the image capturing apparatus.

* * * * *